United States Patent [19]
Balogh

[11] Patent Number: 5,946,202
[45] Date of Patent: Aug. 31, 1999

[54] BOOST MODE POWER CONVERSION

[75] Inventor: W. Thomas Balogh, Houston, Tex.

[73] Assignee: Baker Hughes Incorporated, Houston, Tex.

[21] Appl. No.: 09/010,660

[22] Filed: Jan. 22, 1998

Related U.S. Application Data

[63] Continuation-in-part of application No. 08/788,748, Jan. 24, 1997.

[51] Int. Cl.$^6$ .................................................. H02M 3/335
[52] U.S. Cl. ............................... 363/26; 363/89; 363/97; 363/134
[58] Field of Search ................................. 363/15, 16, 24, 363/25, 26, 84, 89, 95, 97, 125, 126, 127, 131, 133, 134

[56] References Cited

U.S. PATENT DOCUMENTS

| | | | |
|---|---|---|---|
| 4,677,366 | 6/1987 | Wilkinson | 323/222 |
| 4,688,162 | 8/1987 | Mutch et al. | 363/80 |
| 4,973,896 | 11/1990 | Shinga et al. | 322/28 |
| 5,302,858 | 4/1994 | Folts | 363/132 |
| 5,414,613 | 5/1995 | Chen | 363/52 |
| 5,502,630 | 3/1996 | Rokhvarg | 363/89 |
| 5,684,683 | 11/1997 | Divan et al. | 363/132 |
| 5,793,625 | 8/1998 | Balogh | 363/89 |

FOREIGN PATENT DOCUMENTS

| | | | |
|---|---|---|---|
| 0692863 A2 | 1/1996 | European Pat. Off. | H02M 3/158 |
| 2289581 | 11/1995 | United Kingdom | H02M 7/04 |

OTHER PUBLICATIONS

Prasad, et al. "Active Input Current Waveshaping Method for Three–Phase Diode Rectifiers with Zero Switching Losses", IEEE/IAS Annual Meting, May 1991, Conference Record, pp. 932–938.

*Primary Examiner*—Jeffrey Sterrett
*Attorney, Agent, or Firm*—Madan & Morris, P.C.

[57] ABSTRACT

Boost Mode Regulator techniques are used to provide regulated a.c. or d.c. output from a.c. or d.c. sources. One embodiment involves regulation of the output of an a.c. source to provide a regulated d.c. voltage. The source inductance becomes part of the boost mode circuit, thus avoiding the losses associated with the addition of external inductors. When a three-phase alternator is the power source, the circuit comprises a six diode, three-phase rectifier bridge, three FET transistors and a decoupling capacitor. The invention involves shorting the output of the power source to allow storage of energy within the source inductance. During this time, the decoupling capacitor supports the load. When the short is removed, the energy stored in the inductances is delivered to the load. Because the circuit uses the integral magnetics of the source to provide the step-up function, the efficiency of the design can be quite high. In another embodiment, the leakage inductance of an isolation transformer is used to provide regulated a.c. or d.c. outputs from an a.c. source and to provide regulated a.c. or d.c. output from a d.c. source. Where a d.c. source is used, chopper circuits are used on the primary side of the transformer. The invention provides for regulation of the output voltage or for maintaining a power factor substantially close to unity.

8 Claims, 19 Drawing Sheets

BOOST MODE POWER CONVERSION

CROSS REFERENCE TO RELATED APPLICATIONS

This application is a continuation in part of U.S. patent application Ser. No. 08/788748 filed on Jan. 24, 1997.

FIELD OF THE INVENTION

The invention relates to regulated power supplies using Boost Mode Regulator methods. This includes all combinations in which the input is an A.C. or a D.C. source and the output is also an A.C. or D.C. voltage.

BACKGROUND OF THE INVENTION

Electrical power can be generated in two basic forms: Alternating Current (AC), and Direct Current (DC). In addition, the end uses of electrical energy commonly require a source of regulated voltage or current that may be AC or DC. This invention is concerned with the provision of a regulated AC or DC to a load when the source of the electrical energy may be either AC or DC, possibly at a different voltage. Thus, there are four broad classes of power conversion: (i) AC to DC, (ii) DC to DC, (iii) AC to AC, and (iv) DC to AC. This invention uses Boost Mode Regulator methods in all four types of power conversion.

AC to DC Conversion

In many applications such as automotive applications, an alternator AC output voltage is converted to a DC voltage. This DC voltage can be used to charge a battery, provide power to a variety of electromechanical devices, and supply power to semiconductor electronic circuits. DC generators could be used for the purpose but they are complicated and unreliable. DC generators use commutator brushes that wear out and are often a source of noise. Consequently, alternators are often used for the purpose. Other applications are found in the petroleum exploration industry, where a downhole alternator, connected to a turbine driven by drilling mud, is used as a downhole power source in directional drilling operations.

A main disadvantage of an alternator is that the AC output voltage of an alternator changes with the speed of the main alternator shaft. Some applications require that the output voltage of the alternator remain constant over a wide range of the alternator shaft speed. In prior art, there are two ways of solving this problem. One method is to have an extra winding, called a field winding, in the alternator. This field winding adds to or subtracts from the magnetic flux of the permanent magnet of the alternator. By controlling the current in the field winding, the total magnetic field and therefore the alternator voltage can be controlled. A second method involves the use of a rectifier bridge to convert the alternator AC output to a DC voltage; thereafter, the DC voltage is regulated by a DC to DC converter.

The advantage of the field winding design is that it usually results in a much simpler electrical control circuit than would be required for direct regulation of the alternator output. However, this extra winding has several disadvantages. It complicates the alternator design, it increases the number of connections to the alternator, adds to the weight of the alternator and it reduces the overall power capability of the alternator for a given alternator size.

Regardless of the regulator method employed, the alternator AC voltage must be converted to a DC voltage for many applications. A commonly used arrangement for generation of DC voltage from a three-phase alternator is shown in FIG. 1A. It incorporates a six-diode rectifier bridge that selectively applies the most positive and the most negative potential of each alternator phase to the load. The problem with simple diode rectification is that it can be very inefficient. During certain time intervals, one of the three phases may have a positive phase voltage and a zero phase current. This means that at a time when it could be providing power, no power is delivered from this phase, i.e., the circuit has a low power factor.

The efficiency of power utilization can be improved by applying the concepts employed in a boost mode regulator. A simplified circuit diagram is shown in FIG. 2A. The illustration assumes a DC power source and an external resistance and inductance. A Field Effect Transistor (FET) Q1 is used to short the series-connected source circuit for a time that is small in comparison to the time constant of the source circuit (defined as the ratio of the inductance to the resistance). During the shorting interval, the voltage across the inductor increases linearly. When the FET is turned off, the voltage across the inductor reverses. In this state, the voltage across the inductor adds with that of the source to produce a voltage greater than that of the source alone. In this manner, the circuit of FIG. 2A boosts the output of the source voltage. The amount of the boost is determined by the FET on time duty cycle and the ratio of the load resistance to the source resistance.

The inventions of Wilkinson (U.S. Pat. No. 4,677,366) and of Mutoh et al. (U.S. Pat. No. 4,688,162) disclose methods of improving the power factor of a rectifier control apparatus connected to a single phase AC power supply. Wilkinson uses a boost converted while Mutoh uses a chopper circuit to improve the power factor. Both designs use inductors as energy storage elements of the design Prasad discloses a power conversion circuit operating in discontinuous conduction mode connected to a three-phase power supply. It utilizes only one switching device on the dc side of a six-diode rectifier bridge rectifier to shape the line current. While this results in fewer components and simplified control and drive circuitry, the load on the switching device is substantially increased. Also, the circuit uses an input filter, and to accommodate a smaller input filter the power device has to switch at a higher frequency. There is a practical limit to the frequency imposed by losses in the switching means.

The invention of Chen (U.S. Pat. No. 5,414,613) teaches a device similar to that of Prasad except for the addition of a snubber network. The snubber network reduces the switching losses and stresses on the switching device. This enables the device to operate at higher frequencies. In the teachings of Wilkinson, Mutoh, Prasad and Chen, the power source itself is idealized, having no resistance or inductance. There are many applications where this assumption is not true. In particular, where the power source is an alternator with an impedance that is comparable to the impedance of the load, the power source can no longer be treated as a constant voltage source and the conversion circuit cannot be analyzed independently of the source. This is particularly important in hydrocarbon exploration where both the alternator and the load are near the bottom of a well that may be thousands of meters deep. In these applications, maintaining high efficiency is important. In addition, in downhole applications, the diameter of the alternator is limited by the size of the wellbore. As would be familiar to those knowledgeable in the art, a small diameter alternator requires that the alternator have more winding turns, resulting in a higher inductance.

The problems related to three phase power circuits also have their equivalents in single phase power circuits. In many applications, an isolation transformer is used to isolate an AC voltage source from its load. This isolation is often required in commercial applications as a user safety precaution. In case of a fault of either the AC power source or the load, the isolation transformer can prevent the application of dangerously high AC voltages to user accessible locations.

Typically, isolation transformers physically isolate the input and output power windings and connections. In the most severe circumstances, the input or output fault causes a short circuit within the transformer itself. Even so, the input and output voltage are isolated from each other and the damaging voltages or currents are prevented from propagating beyond the transformer. As such, this isolation can be used to protect the user and to protect sensitive electronic circuits from damage.

To further complicate matters, when large output capacitors are used, the less than unity power factor of the circuit means that the peak source current has to be much larger than it would have to be to sustain the load in comparison with the unity power factor case. As such, these larger peak currents not only cause excessive power losses in the source itself but also lead to increased power losses in the isolation transformer.

DC to DC Conversion

Many of the considerations that are present in DC to AC power conversion are also present in DC to DC power conversion. Divan et. al. (U.S. Pat. No. 5,684,683) disclose a DC-to-DC converter having an input side circuit that includes two converter bridges, and an output side circuit that includes two diode rectifier configurations. The input and output circuits are preferably connected by a co-axial winding transformer. Switches in the input side bridges alternately connect and disconnect a DC input voltage to and from the primary side of the transformer. The waveform appearing on the secondary of the transformer is rectified by the output side rectifier configuration. The problems noted above with respect to low power factor, and consequent power losses in the transformer are also present in DC to DC conversion.

AC to AC POWER Conversion

AC to AC power conversion is commonly performed using transformers. The transformer may be of either the isolation type or may have the primary and secondary windings wound closely together. Regardless of the type of transformer use, the most pressing problem is usually that of power factor correction. A commonly used method to correct the power factor and improve the efficiency is to have large devices, usually capacitors, for power factor correction. These devices are located in the power distribution network and at user facilities. These are expensive and have large power losses associated with them. In addition, in using these fixed power factor correction devices, the assumption is made that the required power factor correction is a fixed quantity. This assumption is not always satisfied, and in the present invention, the amount of power factor correction can be changed.

DC to AC Conversion

DC to AC conversion is typically used as part of an AC to DC to AC conversion. There are two broad categories of uses of AC to DC to AC conversion. One is in Extra High Voltage transmission lines where line losses associated with DC transmission over long distances are significantly lower than line losses with comparable AC transmission lines. A second category of use is in uninterruptible power supplies where a primary AC source is used to power DC bus lines connected to a battery. The DC bus lines also serve as the "power source" for an AC load via a DC to AC conversion. When the primary AC supply is interrupted for any reason, the battery powers the DC bus lines, ensuring continuing AC supply to the load. In either case, transformers, chopper circuits and rectifier bridges are used with accompanying problems noted above.

There is a need for an invention that obtains a steady output voltage at the load, whether powered by a three phase generator or by an isolation transformer and maintains an adequate power factor, whether the load is AC or DC There is need for a device that reduces the losses of the standard diode rectifier arrangement and improves the power factor. The present invention satisfies this need.

SUMMARY OF THE INVENTION

In one aspect, the invention is a circuit and method that involves the application of boost mode regulator techniques to alternator power generation. With this invention, the alternator inductance becomes part of the boost mode circuit, thus avoiding the losses associated with the addition of external inductors. The circuit combines a three phase alternator, a six diode, three-phase rectifier bridge, three FET transistors and a decoupling capacitor. The invention involves literally shorting the phase outputs of a three phase alternator together to allow storage of energy within the alternator inductance. During this time, the decoupling capacitor will support the load. When the short is removed, the energy stored in the inductances will be delivered to the load. Like a boost mode power supply, the alternator boost circuit can directly boost the raw output voltage of an alternator. The circuit uses the integral magnetics of the alternator to provide the step-up function; therefore the efficiency of the design can be quite high.

In another aspect, the invention is a circuit and a method that involves the application of boost mode regulator techniques to controlling the output of an isolation transformer. The circuit combines a four diode rectifier bridge, two FET transistors and a decoupling capacitor and uses the internal inductance of the isolation transformer to provide the step-up function.

In yet another aspect, the invention is a circuit and method that involves the application of boost mode regulator techniques to providing a controlled DC output from a DC power source. The primary side of a transformer is connected to a DC source and two FET switches that serve the function of chopping the DC source voltage. The secondary side of the transformer is coupled, via a diode rectifier bridge, with two associated FETs, to the load. The circuit uses the internal inductance of the transformer to provide the step-up function.

In yet another aspect, the invention is a circuit and method that involves the application of boost mode regulator techniques to providing a controlled AC output from an AC power source. The source is connected to the primary of a transformer. The transformer is provided with a pair of secondary windings, one connected to the load and the second to a two-diode rectifier bridge with associated FETs. The circuit uses the internal inductance of the transformer to provide the step-up function..

In yet another aspect, the invention is a circuit and method that involves the application of boost mode regulator techniques to providing a controlled AC output from a DC power source. The primary side of a transformer is connected to a DC source and two FET switches that short the transformer to ground. The transformer is provided with a pair of secondary windings, one connected to the load and the second to a two-diode rectifier bridge with associated FETs. The circuit uses the internal inductance of the transformer to provide the step-up function.

DETAILED DESCRIPTION OF THE INVENTION

Prior Art

Figure 1A:
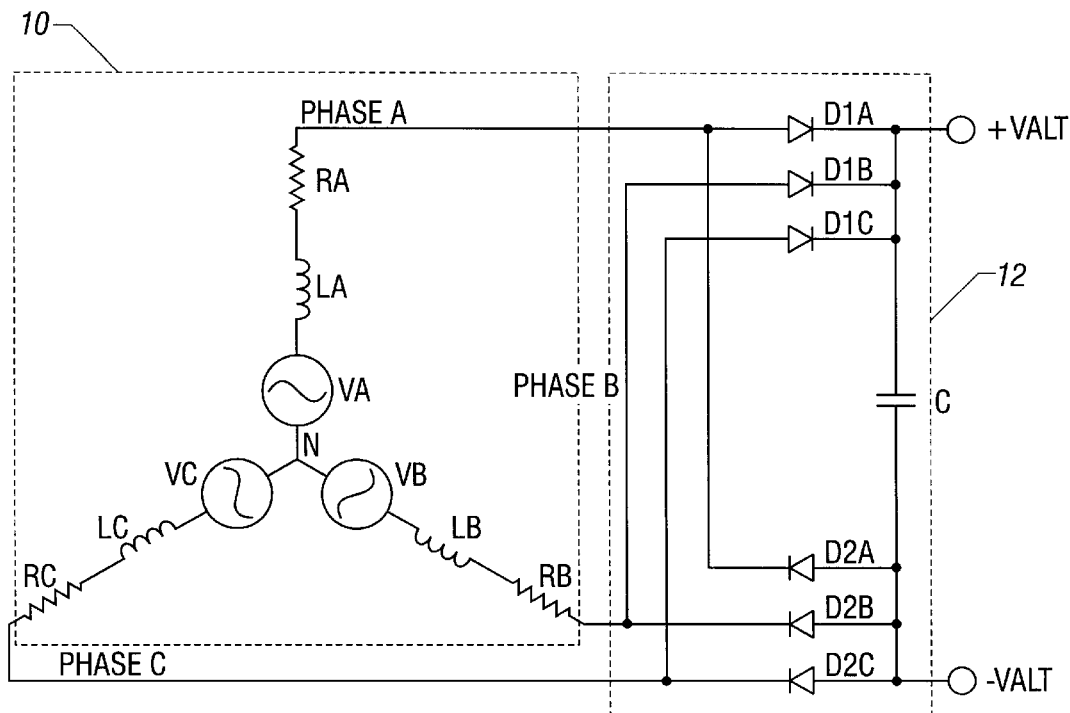
FIG. 1A shows a prior art method for converting a three-phase alternator output to a DC output.

The present invention is best understood by first referring back to prior art methods of obtaining DC output from a three phase alternator. FIG. 1A shows a six diode full wave rectifier bridge, 12, connected to a "Y" connected three-phase alternator, 10. The three phases each have a voltage source, labeled VA, VB and VC that are connected to a common neutral, N. Each of the three phases of the alternator has an associated resistance and inductance, labeled RA, LA, RB, LB, RC and LC. The six diodes are D1A, D1B, D1C, D2A, D2B and D2C. The three D1 diodes provide the positive output while the three D2 diodes provide the negative output. The decoupling capacitor C is placed between the output terminals.

Figure 1B:
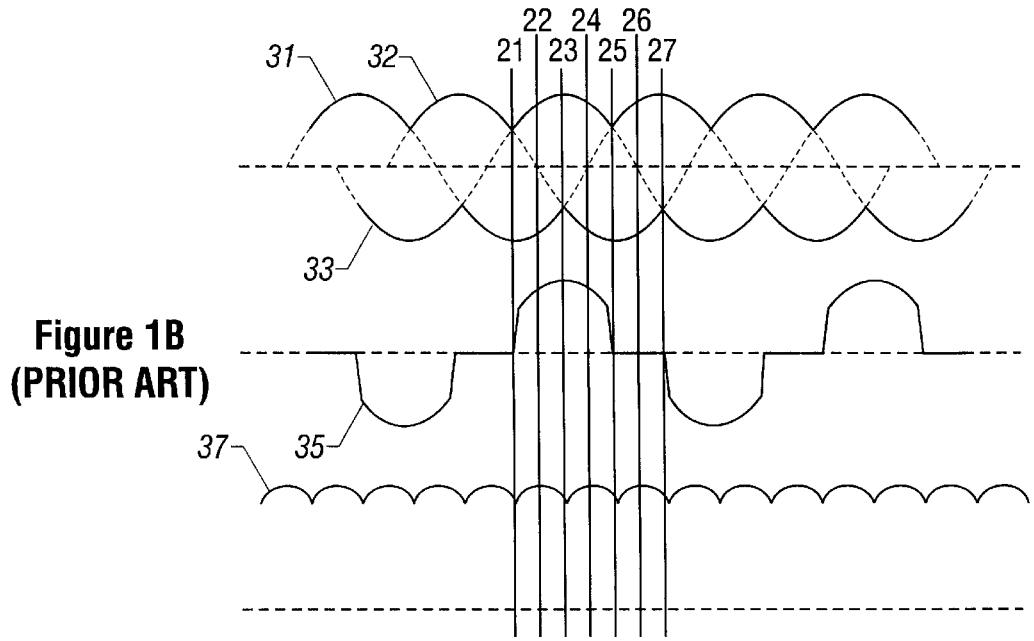
FIG. 1B shows voltage and current waveforms for the prior art method of FIG. 1A.

FIG. 1B shows the ideal voltage and current waveforms associated with this full wave rectifier. The top part of FIG. 1B shows the voltages of each phase relative to the common neutral. These are labeled 31, 32 and 33 and are shown 120° out of phase with each other. The six diode rectifier bridge selectively applies the most positive and the most negative potential of each alternator phase to the load. These most positive and negative portions can be seen as the solid portions of the curves 31, 32 and 33. Between time reference points 21 through 25, the voltage 33 from phase C is the most positive. Therefore, its voltage is applied to the positive side of the load. Likewise, from time reference points 23 through 27, phase B is the most negative and applied to the negative side of the load.

The middle part of FIG. 1B shows the phase current, 35, for phase C of the alternator. Between time intervals 21 through 25, the phase current is positive, as would be expected. However, during the time interval 25 through 26, the phase C voltage is still positive but the phase C current is zero. During this interval, phase C could be delivering power but is not. This is a major problem with diode rectification. As a result of this, a three phase full wave rectified load has a power factor less than unity.

The rectified voltage, 37, is shown in the bottom part of FIG. 1B. Note that the minima of this trace occur at times 21, 23, 25 and 27, these being the times when one phase just begins to conduct and take the load from another phase. This minimum voltage can become a problem whenever the inductances of the alternator are relatively large, a situation that occurs when the diameter of the alternator is small. Referring to the phase C current 35 at times 21 and 25, the current must change rapidly from zero to a fairly large value. However, currents through an inductor cannot change rapidly: this can produce unacceptable sags in the rectified output during heavy load conditions. Consequently, the output capacitor, C, must be sized to support the load during these phase current conditions.

Figure 10A:
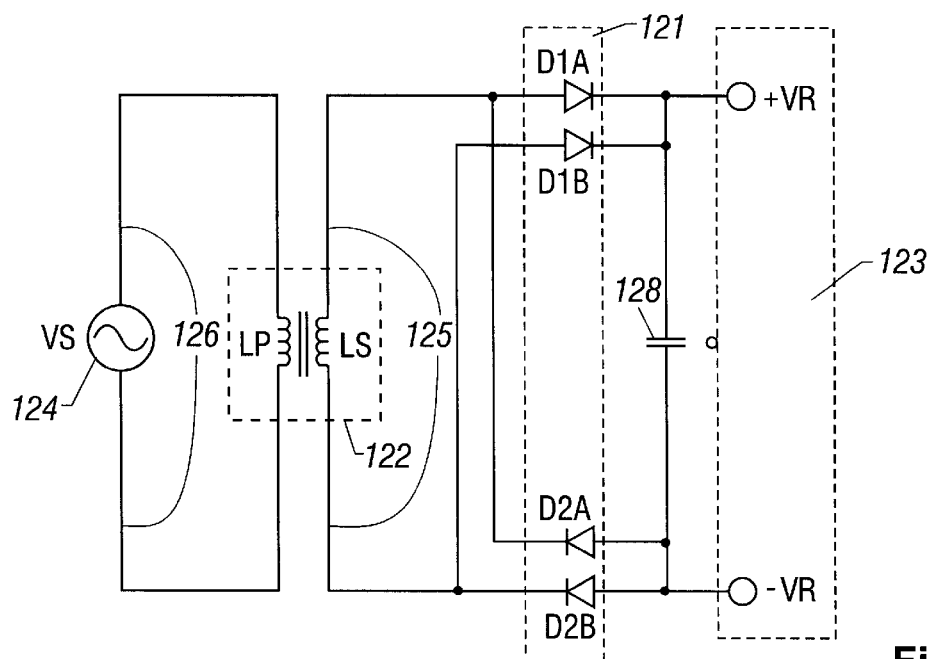
FIG. 10A shows a prior art four diode full wave rectifier circuit used to convert the output of an isolation transformer

The same concepts that to a three-phase circuit also apply to a single phase arrangement using an isolation transformer. FIG. 10A shows a four diode full wave rectifier circuit used to convert the output of an isolation transformer 122 to a DC voltage ±VR present at the output terminals 123. The isolation transformer 122 provides isolation between the single phase power source 124 and a load across the output terminals. The four diodes 121 comprising the full wave rectifier circuit are D1A, D1B, D2A and D2B. The two D1 diodes provide the positive output +VR and the two D2 diodes provide the negative output −VR. The output capacitor 128 serves to smooth the DC output voltage.

Figure 10B:
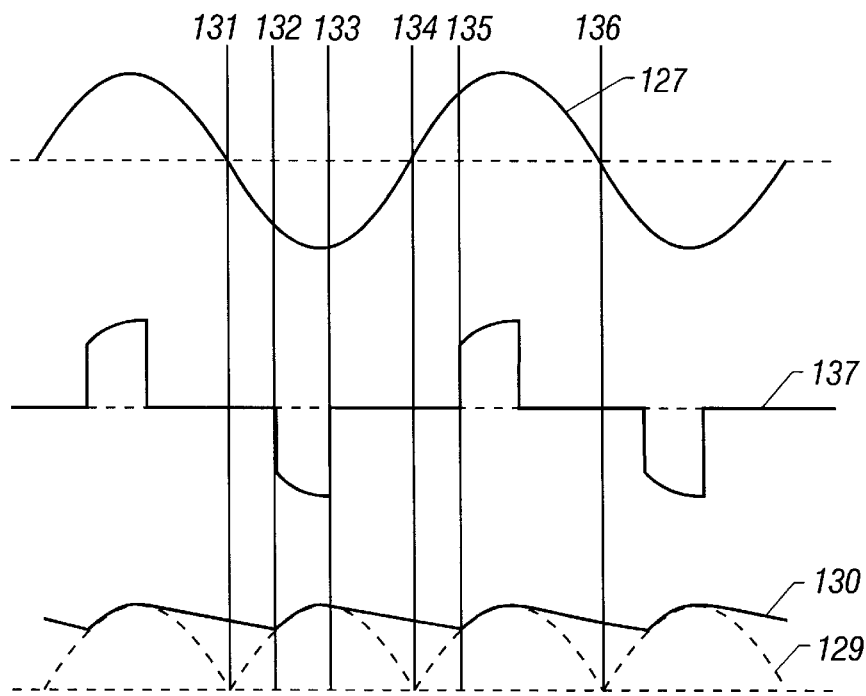
FIG. 10B illustrates the ideal voltage and current waveforms associated with the full wave rectifier circuit of FIG. 10A

FIG. 10B illustrates the ideal voltage and current waveforms associated with this full wave rectifier circuit. The trace 127 is the sinusoidal voltage seen across the single phase power source. In this example, for illustrative purposes only and not as a limitation, the isolation transformer 122 is assumed to have a 1:1 turns ratio. Therefore the voltage 126 across the source is also present at the input 125 to the full wave rectifier.

The diode rectifier bridge 121 selectively applies the most positive and the most negative potential of the voltage 125 to the load at the output terminals 123. The resultant output voltage is shown for the case where there is no output capacitance 129 and for the case where there is a large output capacitance 130. Between the time reference points 131 and 134, the voltage from the source is negative and therefore diodes D1B and D2A are conducting. Between time reference points 134 and 136, the voltage from the source is positive and diodes D1A and D2B are in conduction.

The problem with simple diode rectification is that it can be very inefficient. In this example, it is assumed that the decoupling capacitance is large. The source current shown as waveform 137 is negative during the time interval from 132 to 133 whereas the source voltage is negative for the larger time interval from 131 to 134. During the times from 131 to 132 and 133 to 134, when the source voltage is negative, it is providing no current, i.e., it has a low power factor. This is a major problem with simple diode rectification.

The power factor can be increased to unity if the load were purely resistive and there were no output capacitance. In such a case, the output voltage and the source current are in phase; however, the output voltage 129 has unacceptably large ripple. In fact, at certain times 131, 134 and 136, it goes to zero. This is usually unacceptable for most applications. Consequently, the output capacitor 129 must be sized large enough to support the load during these sags in the source voltage.

Figure 2A:
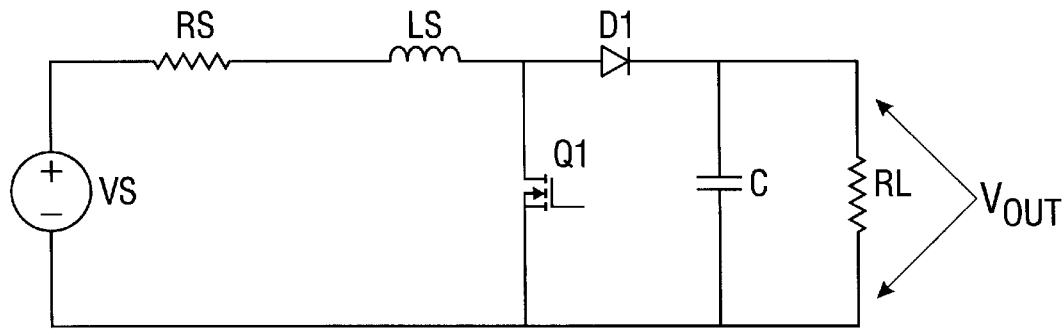
FIGS. 2A and 2B show a prior art method for boosting the voltage of a power supply and its performance characteristics.

The second piece of prior art that is of relevance is the boost mode regulator. FIG. 2A shows this for a DC power source, VS, connected to a resistance R and inductance L, connected to a resistive load RL. A Field Effect Transistor (FET), Q1, is used to short the series connected source circuit. The time that Q1 is shorted is assumed to be short relative to the time constant of τ of the source defined by $$\tau = \frac{L}{R} \tag{1}$$

During this shorting interval, the current through LS increases linearly. When Q1 is turned off, the voltage across L reverses. This condition is called the inductor flyback. In this condition, the voltage across the inductor adds with that of the source to produce a voltage greater than that of the source alone. The output voltage VOUT is given by $$\frac{VOUT}{VS} = \frac{(1-DC)}{(1-DC)^{!!} + \frac{R}{R_V}} \tag{2}$$

where DC is the on time duty cycle of the FET (defined as the ratio of the on time of the FET divided by the sum of the on time and the off time of the FET).

Figure 2B:
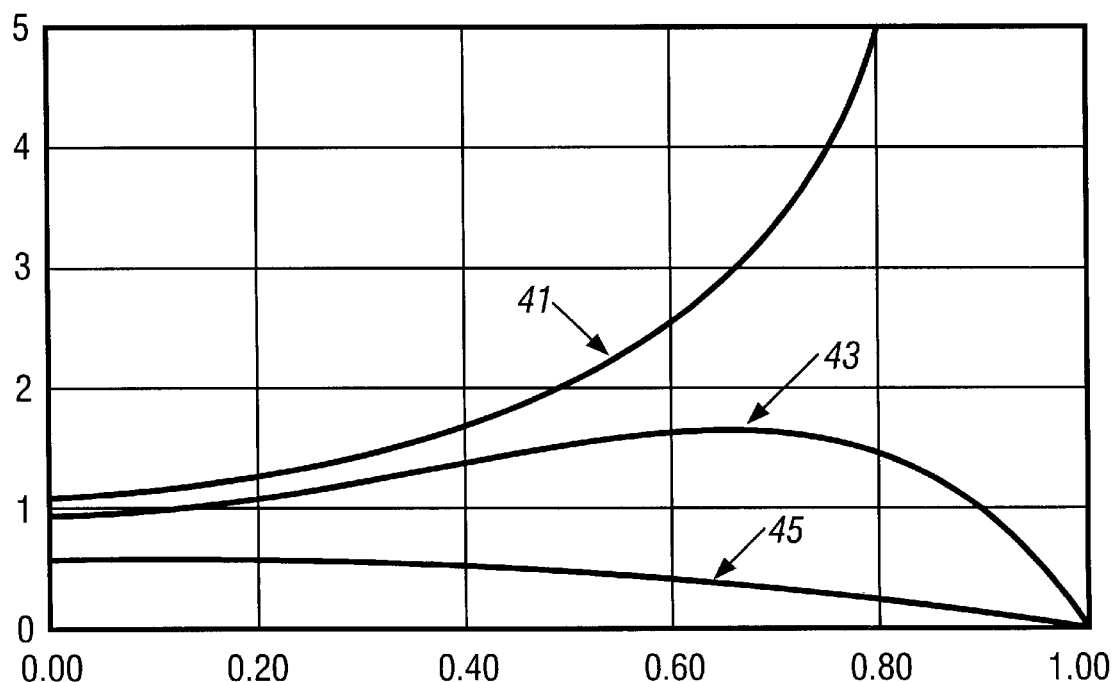

FIG. 2B shows this voltage boost graphically. The abscissa is the duty cycle DC of the FET and the ordinate is the voltage boost VOUT/VS. The curve 41 corresponds to the case where $R_L >> R$. The curve 43 corresponds to the case when $R_L = 10 \times R$ while 45 is for the case when $R_L = R$. It can be seen that large voltage boosts can be obtained when the load resistance is much greater than the resistance in series with the source.

The Present Invention

Figure 3:
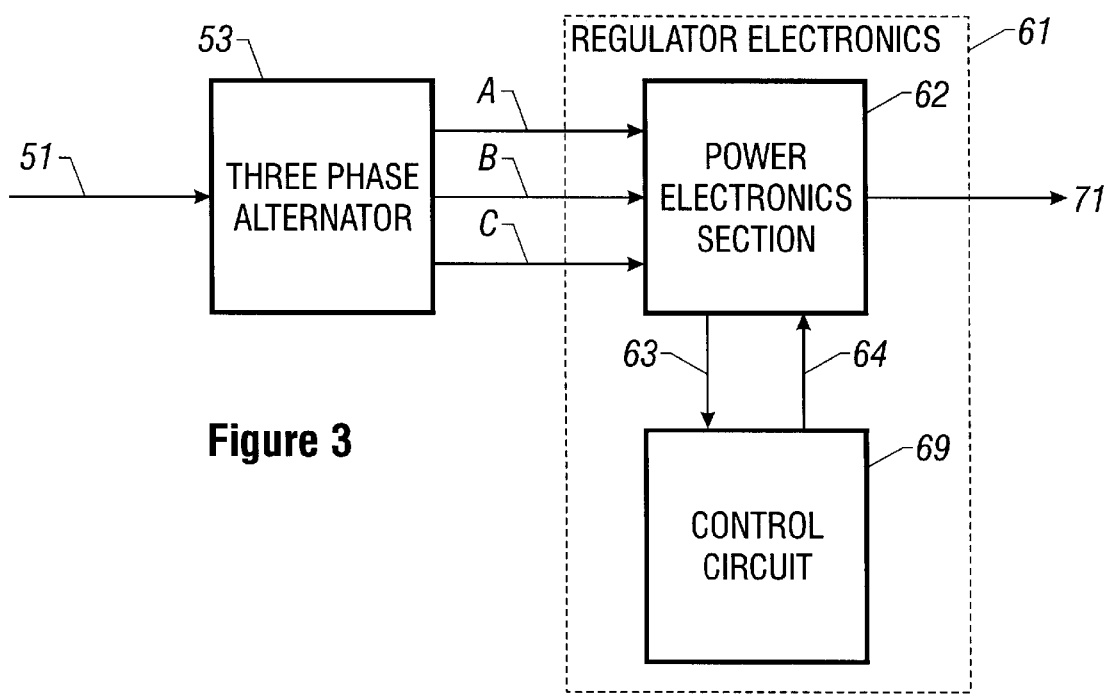
FIG. 3 shows a block diagram of a power system incorporating one embodiment of the present invention

FIG. 3 is a block diagram depicting the use of one aspect of the present invention. A rotor shaft drive 51 powered by a mechanical source (not shown), drives a three phase alternator 53. The three phases of the alternator are indicated as A, B and C. The regulator electronics 61 includes of two main parts. The power electronics section 62 is connected to the phases A, B and C of the alternator and has as its output a DC voltage, 71. The control circuit 69 receives sensing signals 63 from the power electronics section, and based upon the sensing signals, controls the operation of the power electronics section by means of drive signals 64.

Figure 4:
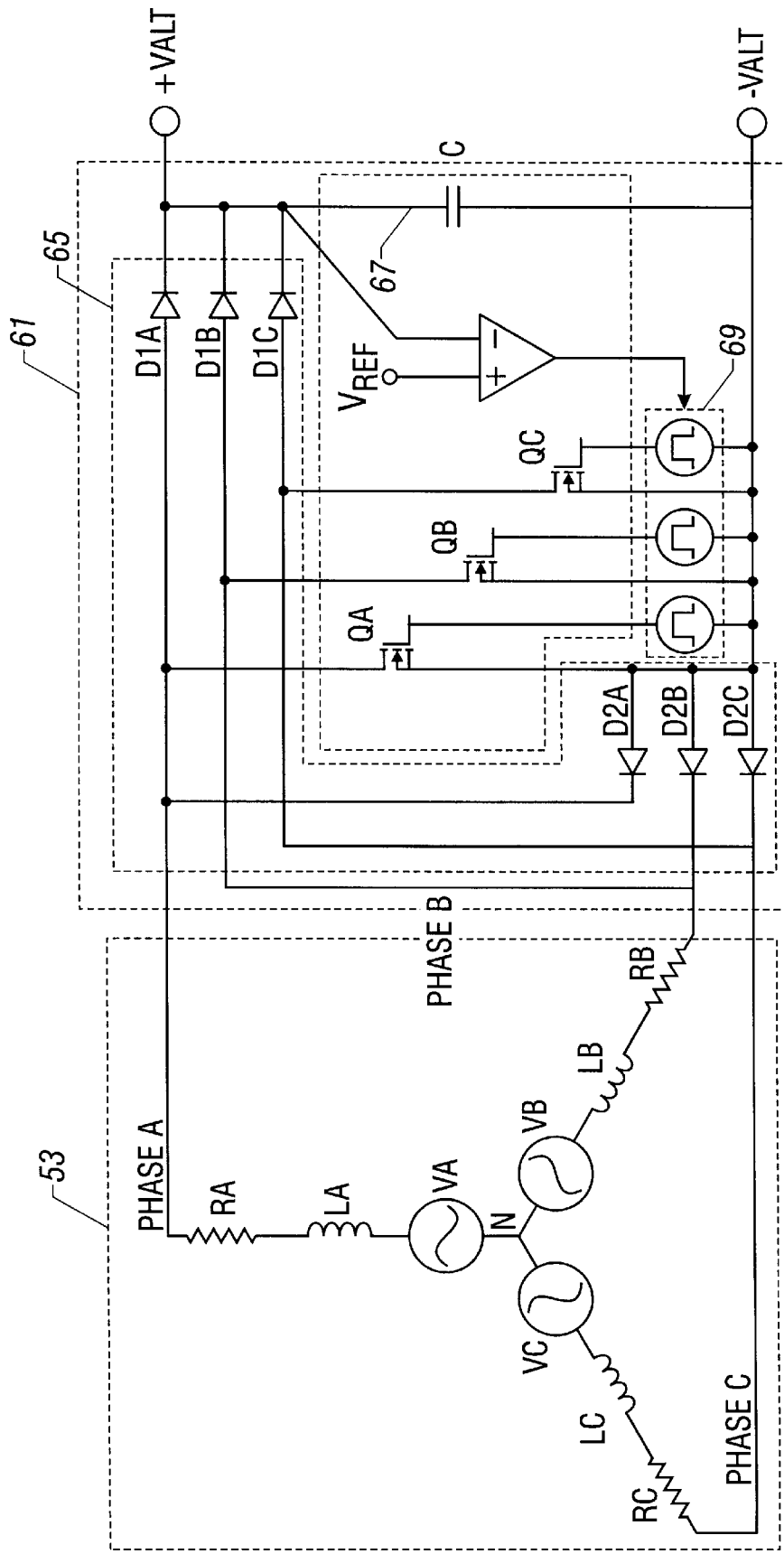
FIG. 4 shows a circuit diagram for the power components used in the embodiment of FIG. 3.

FIG. 4 is a detailed illustration of a portion of one embodiment of the present invention showing the alternator 53 connected to the power electronics section 62. The three phases of the alternator are represented by the voltage sources VA, VB and VC; their respective resistances, RA, RB and RC; and their respective inductances, LA, LB and LC. The power electronics sections 62 comprises a rectifier section 65 and a power section 67. The rectifier section 65 comprises a six diode, full wave rectifier bridge D1A through D1C and D2A through D2C. The power section comprises a three shorting FETs QA through QC and an output capacitor C. The control section 69 comprises a PWM voltage sources that control the opening and closing of the FETs QA through QC. The load is attached to the output across the output capacitor. The voltage across the load is denoted by ±VALT.

Figure 5:
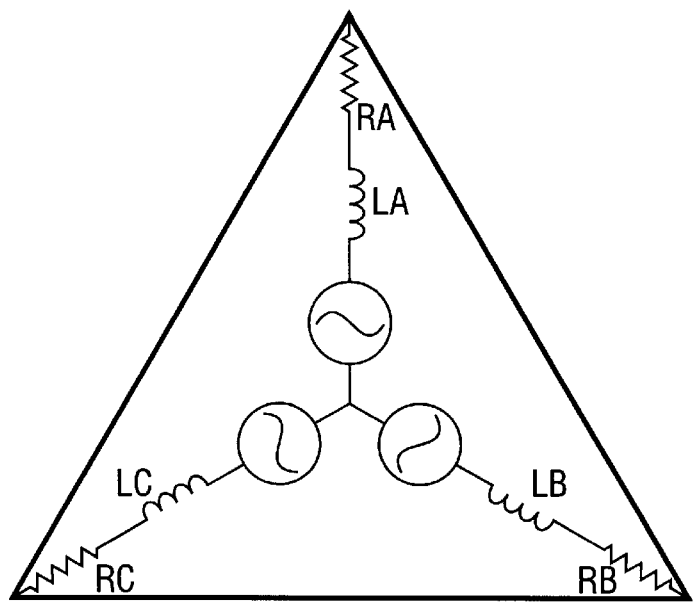
FIG. 5 shows the equivalent circuit of the alternator at one instant of time in the embodiment of FIG. 4.

FIG. 5 shows the equivalent circuit of the alternator when all three of the FETs are shorted. The device operates in a manner similar to the Boost Mode Regulator discussed above in the prior art. When the FETs short the output of the alternator, as shown in FIG. 5, the energy is stored in the alternator inductances LA, LB and LC. This is different from prior art boost mode regulators in which an additional inductance is a part of the regulator. Instead, the internal inductance of the three phases of the alternator themselves function as the flyback element. When the FETs are turned off, the voltage across the inductances combines with the open circuit voltages VA, VB and VC to boost the output of the alternator. The boosted output is applied through the diodes 65 to the load at the ±VALT terminals.

Figure 6:
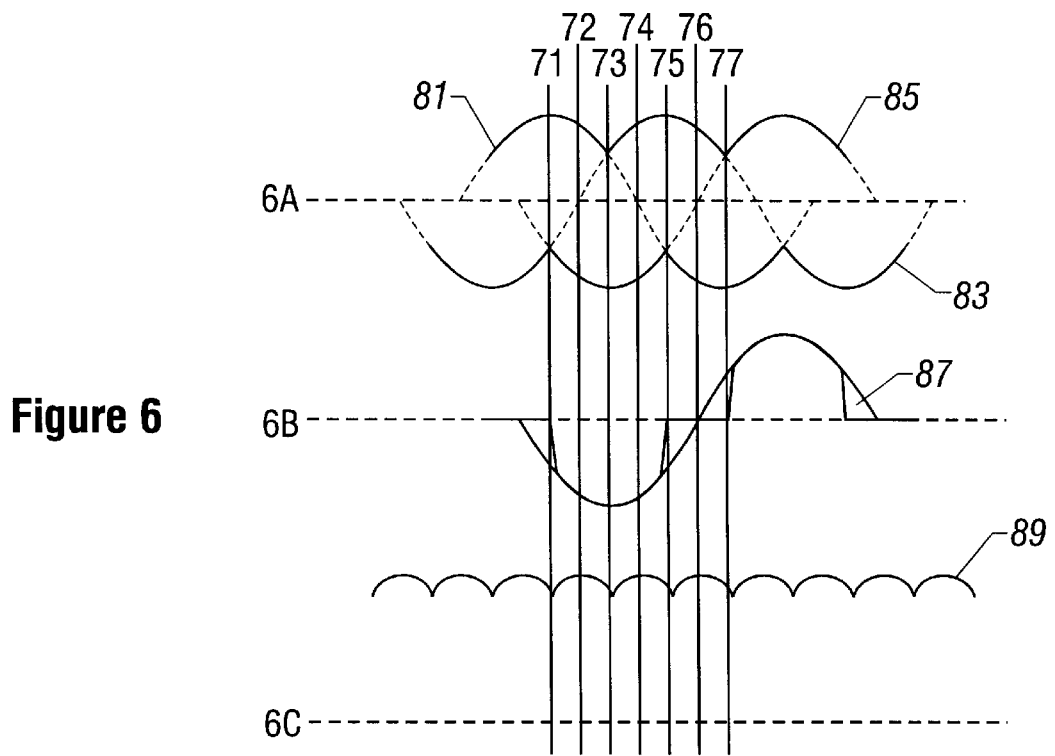
FIG. 6 shows the voltage and current waveforms associated with the embodiment of FIG. 4.
Figure 7:
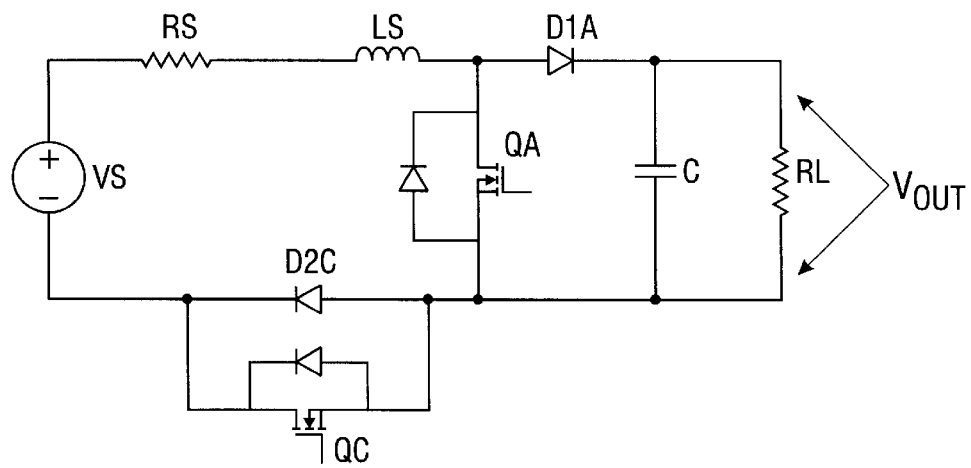
FIG. 7 shows the equivalent circuit of the embodiment of FIG. 4. at one instant of time when one of the phases of the alternator is at zero voltage.
Figure 8:
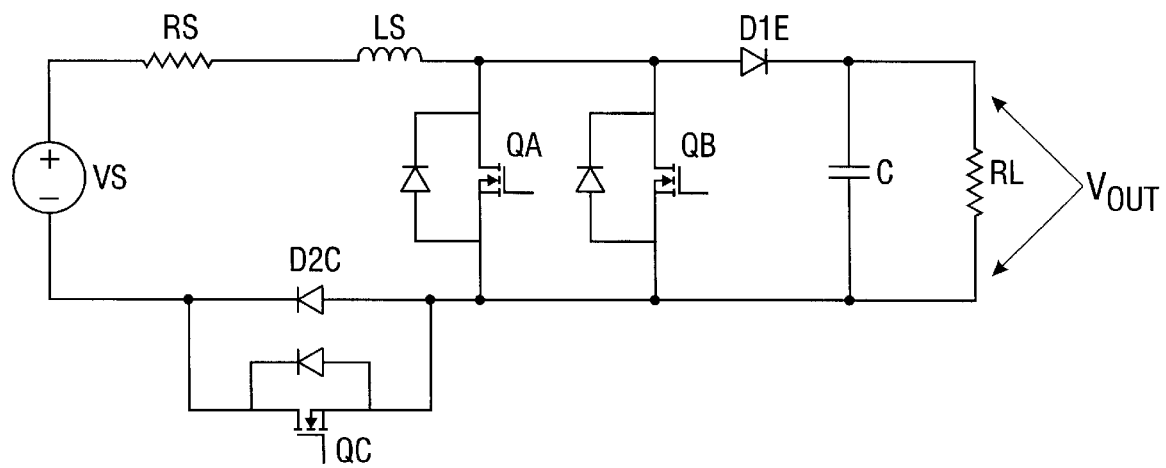
FIG. 8 shows the equivalent circuit of the embodiment of FIG. 4. at another instant of time when two of the phases of the alternator are at the same positive voltage.

The operation of the invention is best understood with reference to FIGS. 6, 7 and 8. FIG. 6B depicts the voltage and current waveforms of the Boost Mode Regulator (BMR) circuit. Shown are the voltages of phase A 81; phase B 83 and phase C 85. Reference times 71 through 77 are also indicated in FIG. 6. These times will be referred to in the discussion below of the operation of the invention. FIG. 6B depicts the idealized waveform for the current in phase A 87. FIG. 6C shows the rectified output 89 for the case where the BMR is operating open loop or unregulated, i.e., all the FETs are open.

FIG. 7 is the equivalent circuit of the alternator-BMR circuit during reference time 72. At this time, the phase B voltage 83 is zero and the phase A voltage 81 and the phase C voltage 85 have the greatest difference. At this instant in time, the following relations hold:

$$VS = VA - VC = 2VA \tag{3}$$

$$RS = RA + RC = 2RA \tag{4}$$

$$LS = LA + LC = 2LA \tag{5}$$

and the total resistance of the two FETs in series is $$R_{total} = R_{sw} + R_{sw} = 2 R_{sw} \tag{6}$$

When the FETs QA and QC are turned on, no current flows through D1A and D2C. The total power losses in the loop are associated with the alternator resistance RS and resistive losses of the two FETs $R_{total}$.

The boost regulator step-up is given by $$\frac{V_{\gg\ominus\oplus}}{V_\ominus} = \frac{(1-DC)}{(1-DC)^{\text{II}} + \frac{R_\ominus(1-DC) + (R_\ominus + 2R_{\ominus|})DC}{R_V}} \quad (7)$$

One advantage of the BMR concept is that it compensates for sags in the three phase alternator output voltage. This is illustrated in FIG. 6C at reference time 73. The voltage sag appears in thee rectified output when one alternator phase is at its maximum positive or negative voltage and the other two phases begin to share the load. At this time, the other two phases sharing the current have an equal amplitude and polarity. The equivalent circuit at this time is given by FIG. 8. In FIG. 8, D1E is the lumped equivalent of diodes D1A and D1B. The following relationships hold:

$$VS = VA - VC = VB - VC \quad (8)$$

$$RS = RA \| \| RB + RC = 1.5 \, RA \quad (9)$$

$$LS = LA \| \| LB + LC = 1.5 \, LA \quad (10)$$

$$R_{total} = R_{sw} \| \| R_{sw} + R_{sw} = 1.5 R_{sw} \quad (11).$$

and

Comparing equations (4) and (9), it is seen that the alternator resistive losses are reduced because of the lower equivalent resistance of the alternator. Similarly, comparing equations (5) and (10), it is seen that the equivalent inductance is also reduced at this instant in time. Those knowledgeable in the art would recognize that this leads to an increase in the power factor of the alternator output. Finally, because the current is shared between two phases, the FET losses are also reduced. As a result of this reduction in the total impedance of the alternator and the FETs there is an increase in the regulator step-up without any change in the duty cycle. The increased R step-up during alternator voltage sags is given by $$\frac{V_{\gg\ominus\oplus}}{V_\ominus} = \frac{(1-DC)}{(1-DC)^{\text{II}} + 0.75\frac{R_\ominus(1-DC) + (R_\ominus + 2R_{\ominus|})DC}{R_V}} \quad (12)$$

The alternator current $I_s$ is related to the load current $I_L$ by the relation $$\frac{I_\ominus}{I_V} = \frac{1}{(1-DC)} \quad (13)$$

The operation of the invention is better understood by examining two illustrative examples. The examples illustrate how, by changing the duty cycle of the FETs, a constant output voltage and output current can be obtained over a wide range of alternator shaft speeds. This is done by the control circuit 69 mentioned above. There are two possible methods by which this can be implemented. In one realization known as voltage mode regulation, the sensing signal 63 is obtained by comparing the desired output to the actual output voltage of the regulator voltage across the output capacitor C. This is illustrated in FIG. 4 where the voltage across the capacitor is compared to a reference voltage $V_{ref}$ and the difference is input to the control circuit 69. This error signal is then used by the control circuit, 69, to adjust the open and close times of the FETs by means of drive signals 64. In a second realization, known as current mode regulation, the load current is then used by the control circuit 69 to adjust the open and close times of the FETs by means of the drive signal 64. Prior art aspects of the control circuit would be familiar to those knowledgeable in the art.

EXAMPLES

Table 1 shows the efficiency of the BMR equivalent circuit of FIG. 7 for an alternator having an open circuit voltage of approximately 35 volts at 5000 rpm It is assumed that diode losses reduce the 35 volts DC output to the desired 33 volts DC level. In Table 2, the losses for the BMR circuit are computed for the alternator of Table 1 at times when the output voltage of the alternator sags. These calculations are based upon the equivalent circuit of FIG. 8.

The basic parameters of the elements of the circuit are listed in the tables and defined here as:

1. Alternator Voltage Factor—open circuit voltage per 1000 rpm.
2. Alternator Resistance—phase to phase resistance of the alternator.
3. Alternator rpm range—ratio of the highest alternator shaft speed, 5000 rpm, to the lowest speed. This lowest speed is presented in the main table and corresponds to a duty cycle of 80% for the FETs.
4. Output Power, Voltage and Current—defined at the load.
5. Output Resistance—effective load resistance calculated using the output voltage and the output current.
6. Diode voltage—assumed constant voltage drop across each diode.
7. Switch resistance—The resistance of the FETs.
8. Switch Frequency—a possible switching frequency that could be used in the preferred embodiment. It is presented here for illustrative purposes only so that AC losses associated with the switching frequency can be computed.
9. Switch C(in), C(out) and C(rt)—are the capacitance characteristics of the FET used to compute switch AC losses.
10. The Return and Shorting Switch Losses—estimated AC losses of the main switch FETs at the assumed switching frequency.

The main table headings and the method used in the calculation are described as follows:

1. Duty cycle—The FET on time duty cycle.
2. Voltage step-up—calculated using equation 7 for Table 1, equation 12 for Table 2.
3. Source voltage—the idealized source voltage Vs required to obtain the desired output voltage.
4. Source current—the idealized source current obtained using equation 13.
5. Alternator speed—the alternator speed required to obtain the desired input voltage.
6. FET-switch loss—the average DC power loss for each FET in the current path.
   This loss occurs only during the FET on time.
7. Diode loss—the average DC power loss for each diode in the current path. This loss occurs only during the FET off time.
8. Total regulator loss—this is the total of losses of the FETs and diodes.
9. Regulator efficiency—the output power, 100 watts, divided by the sum of the output power and the regulator losses.
10. Alternator losses—the power loss within the alternator itself and associated with the alternator resistance.

11. Input power—the input power computed using the source voltage $V_s$ and the source current $I_s$. This is used to verify the accuracy of the losses computed by other means.

In one embodiment of the invention, the BMR circuit is limited to a maximum duty cycle of 80%. It can be seen from Table 1 that for duty cycles of up to this level, the dominant losses of the 33 volts DC output are associated with the diode rectifiers. Even for a 100 watt output, the total diode losses are less than 6 watts and the FET losses are never greater than 4 watts. In addition, for duty cycles of less than 80%, the efficiency of the BMR circuit is always greater than 90% even under low speed and heavy load conditions. The power loss associated with the rectifier diodes is constant.

Those knowledgeable in the art would recognize that higher BMR circuit efficiency could be achieved by replacing the diodes by synchronous rectifiers. However, the circuit would be significantly more complex. In addition, referring to FIG. 7, it can be seen that the diode D2C (and the other return current didoes D2A and D2B) in parallel with the internal drain-to-source diode of the FETs can be eliminated. In an alternate embodiment of the invention, this has, in fact, been done.

Comparison of Tables 1 and 2 show the partial compensation provided by the BMR circuit for voltage sags. As an illustrative example, during alternator voltage peaks, with an 80% duty cycle, the required alternator voltage is 9.1 volts (from Table 1) with an alternator speed of 1307 rpm. During sags, the required voltage for the same duty cycle of 80% is 8.5 volts (from Table 2). At 1307 rpm, Table 2 shows that the alternator voltage sags to approximately 7.9 volts, or approximately 13.3% less than the peak. Thus, at a fixed speed and duty cycle, the actual alternator voltage drop of 13.3% is partially compensated by a 6.5% drop in the required alternator voltage to maintain the same output voltage at the load.

Comparison of Tables 1 and 2 shows that for the 80% duty cycle, the complete alternator and regulator power system becomes more efficient during voltage sags: the input power requirement of the 100 watt output drops from 138.6 watts to 129 watts, an improvement of 6.9%.

Figure 9A:
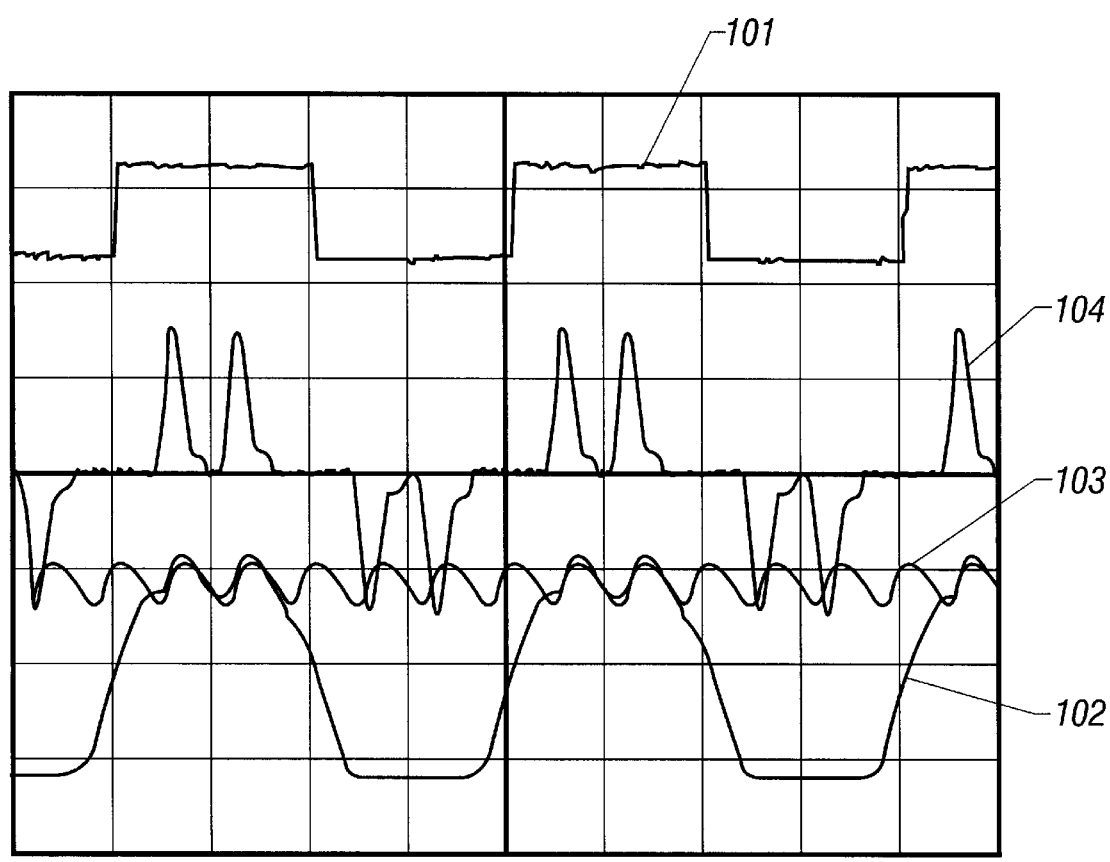
FIGS. 9A and 9B show a comparison of a phase voltage, a phase current and the rectified output when the method of the embodiment of FIG. 4. is disabled with the same voltages and currents when the method is enabled.

Another aspect of the invention is an improvement in the power factor of the alternator-rectifier circuit. This is best understood with reference to FIG. 9. FIG. 9A shows four waveforms for the case where the boost mode is disabled, i.e., the FETs remain in the open position. Under these conditions, the BMR circuit functions like a conventional six-diode rectifier bridge. The curve labeled 101 is a square wave pulse at the synchronous speed of the alternator. The curve labeled 102 is the phase A voltage of the alternator. Similar curves exist for the other two phases of the alternator (not shown). The curve labeled 103 is the rectified output of the circuit, i.e., the voltage across the terminals of the decoupling capacitor C. It shows a significant amount of ripple. The curve labeled 104 is the current in phase A. Comparing 102 and 104, it can be seen that there are large time intervals during which phase A has a sizeable voltage and is delivering little or no current. Those who are knowledgeable in the art would recognize that the power factor corresponding to this relation between the phase voltage and the phase current is rather low.

Figure 9B:
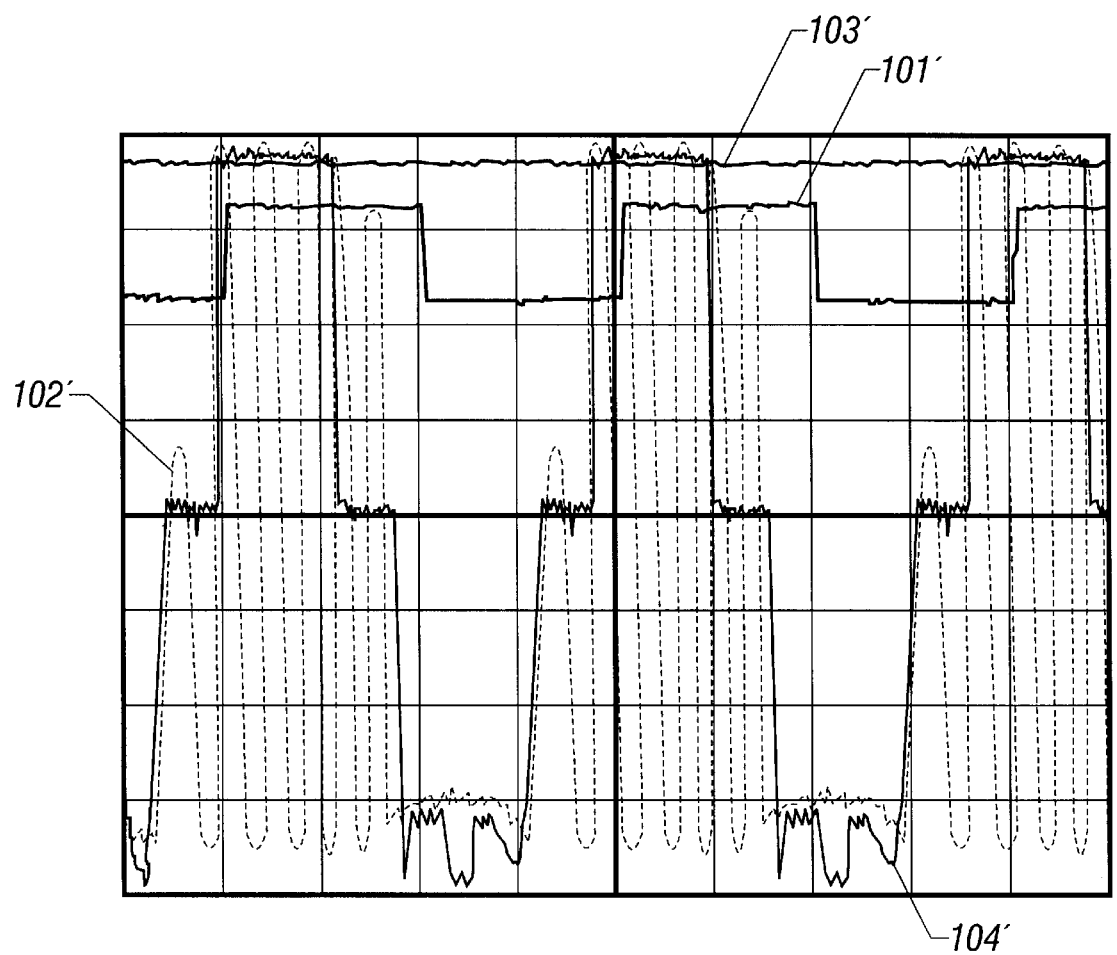

FIG. 9B shows similar curves when the boost mode is enabled, i.e., the FETs are opening and closing at a high speed. The curve labeled 101' is the same square wave pulse as 101 at the synchronous speed of the alternator. 103' is the BMR output voltage and, as can be seen, it has been boosted in comparison to 103. In addition, the ripple that was present in 103 has been almost eliminated. 102', the phase voltage curve when the BMR is enabled, requires some explanation. Because of the high frequency of the switching of the FETs, there is frequency aliasing in the display. The curve can actually be approximated by a high frequency square wave (at the FET switching frequency) modulated by a square wave at the synchronous speed of the alternator, the modulating component being advanced some 60° with respect to the waveform 101'. Comparison of 104', the current in phase A, with the phase voltage 102' shows that the phase current is more in phase with the phase voltage, i.e., it has a higher power factor, than in FIG. 9A. Experimentation with the various parameters of the invention has shown that a power factor of nearly 1.0 can be obtained by increasing the time constant of the regulator.

Figure 11A:
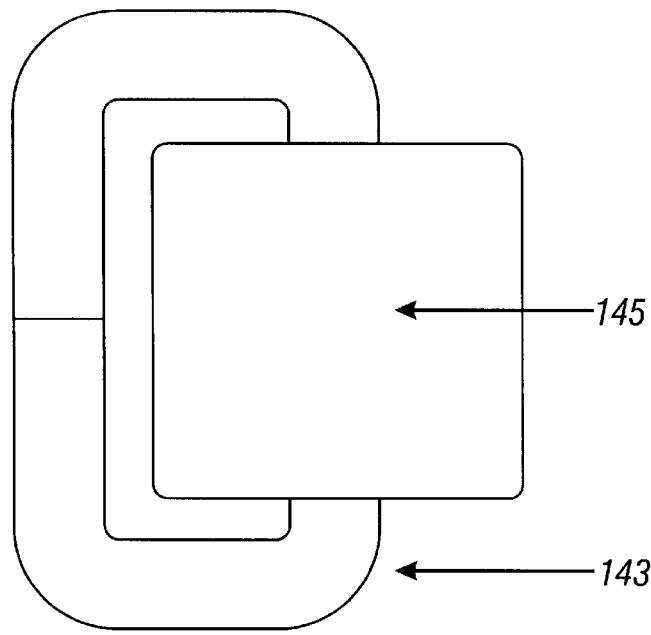
FIG. 11 illustrates the arrangement of windings in two types of prior art transformers.

Another aspect of the invention is the use of Boost Mode Regulator concept in circuits powered by isolation transformers. FIG. 11A illustrates a standard transformer having a core 143 with primary and secondary windings 145 in close proximity to each other. Because the primary and secondary windings experience the same magnetic field. the leakage inductance of such a transformer is small. However, in the transformer of FIG. 11A, the electrical isolation between the windings is poor. Consequently, under fault conditions, it is possible for this type of transformer to develop a short between the primary and secondary coils with the possibility of dangerously high voltages at the secondary terminals.

Figure 11B:
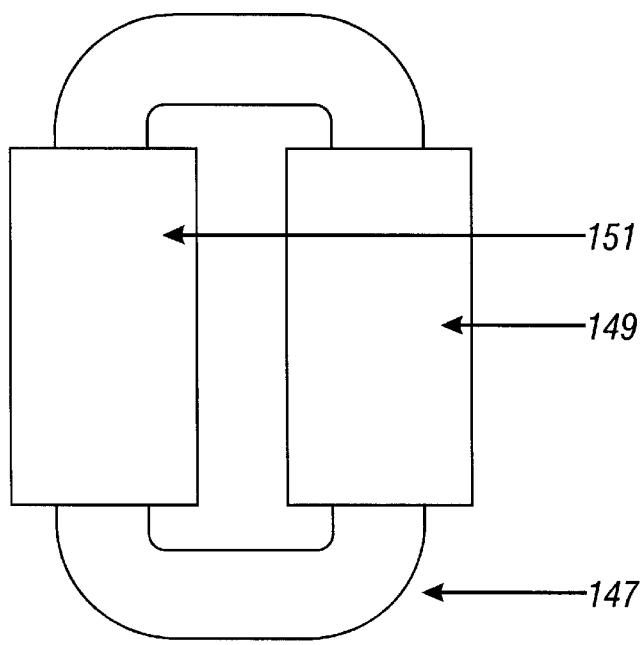

FIG. 11B shows one type of isolation transformer with a core 147 and the primary winding 151 separate from the secondary winding 149. This separation of the primary and secondary windings lessens the danger of a short between the two windings under fault conditions but increases the leakage inductance. Those versed in the art would recognize that an isolation transformer could also be made according to the general shape of FIG. 11A with an arrangement for physically isolating the primary and secondary windings.

Figure 12A:
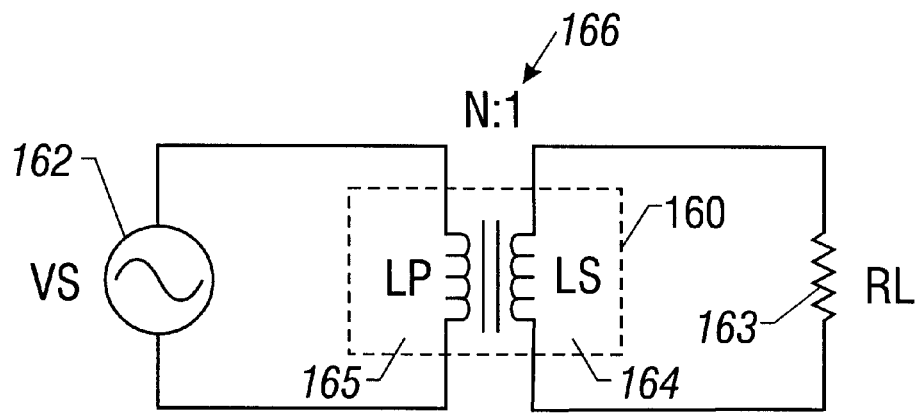
FIG. 12A shows a prior art circuit employing an isolation transformer.

FIG. 12A shows the simplified schematic diagram of a transformer 160 when connected to a voltage source 162 and a resistive load 163. The transformer includes primary windings 165 having an inductance LP and secondary windings 164 having an inductance LS. The winding ratio of the transformer N is related to the number of turns of the primary NP and the number of turns of the secondary NS by the following:

$$N = \frac{NP}{NS} \tag{14}$$

and the voltage VL at the load 163 is $$VL = \frac{VS}{N} \tag{15}$$

where VS is the source voltage.

Figure 12B:
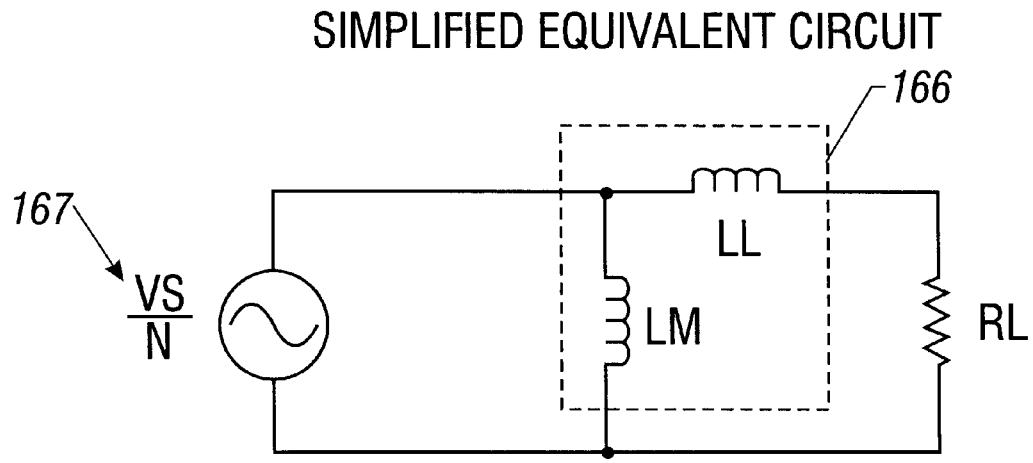
FIG. 12B shows the equivalent circuit for the circuit of FIG. 12A viewed from the load.

The simplified equivalent transformer circuit is shown in FIG. 12B. The circuit is drawn looking back from the resistive load. The transformer 160 has been replaced by the equivalent network 166 and the source voltage has 167 has been modified by the turns ratio N of the transformer. The transformer equivalent circuit 166 is composed of a series leakage inductance LL and a parallel magnetizing inductance LM.

In a properly designed transformer, the impedance of the parallel inductance LM will be large in comparison with the load impedance and the leakage inductance LL will be small in comparison with the magnetizing inductance LM. In such a case, the magnetizing inductance can be ignored and the equivalent circuit simplifies to a three element network consisting of the source, the leakage inductance and the load.

Ideally, the leakage inductance is small. However, isolation transformers are designed to isolate the primary and secondary windings from each other and consequently have a large leakage inductance in comparison with a non-isolated transformer. One aspect of the present invention takes advantage of this large leakage inductance.

Figure 13A:
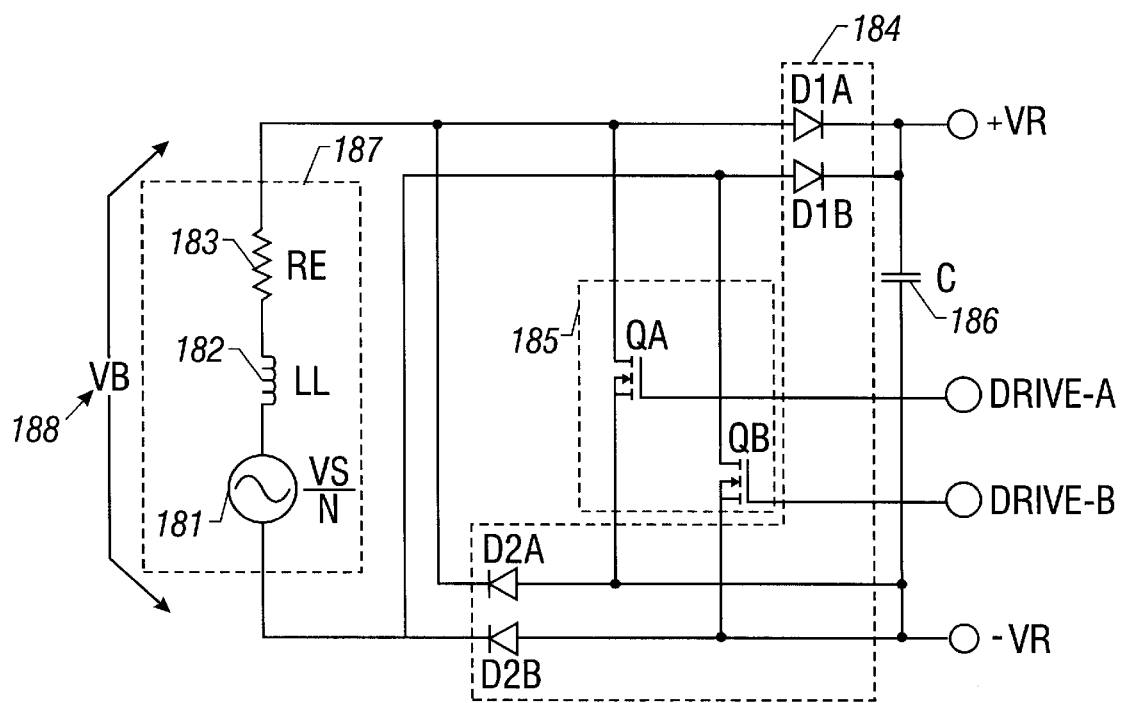
FIG. 13A shows a boost mode circuit employing an isolation transformer.

FIG. 13A is a simplified diagram of an isolation transformer boost mode circuit. Although the invention is directed primarily towards isolation transformers, it can be used with any standard transformer, device or interconnection scheme in which an inductance is introduced in series with an AC voltage source. The circuit includes the voltage source 181, the series leakage inductance 182 of an isolation transformer or other series element, the equivalent series resistance 183 of the source, the transformer and the path between the rectifier bridge 184 and the source, a four-diode full wave rectifier bridge 184, two FET transistors 185, a decoupling capacitor 186 and a load (not shown) connected at the output terminals ±VR. Those versed in the art would recognize the similarity of this circuit with that shown in FIG. 4 for a three phase Boost Mode Regulator Circuit.

For this Boost Mode Circuit, the flyback inductance 182 is the leakage inductance of the transformer. For this design, the transformer turns ratio would be chosen such that the unregulated output voltage seen at the output terminals is always less than the desired output voltage. As with the Boost Mode Circuit of FIG. 4, the FETs 185 turn on to short the output of the series connected source circuit 187. The FET turn on time is short in comparison with the time constant of the source circuit as defined in equation 1.

Figure 13B:
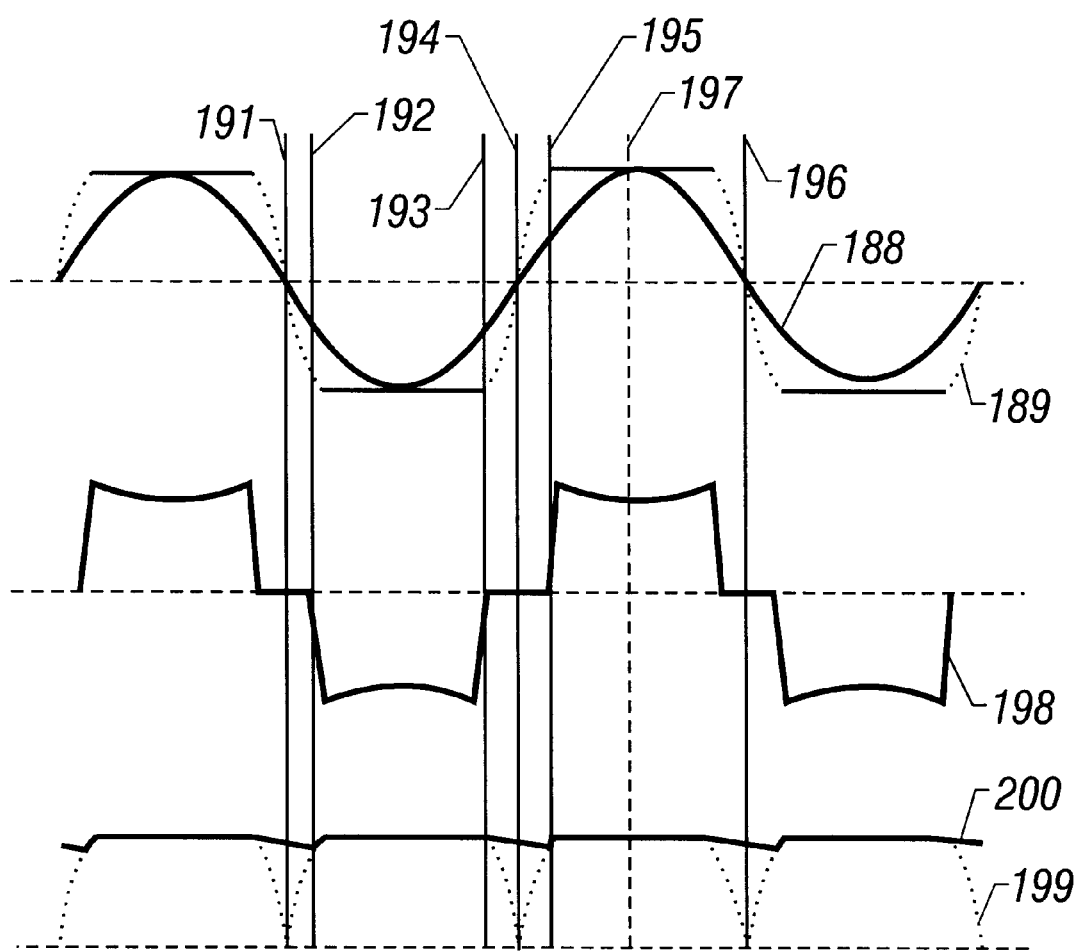
FIG. 13B shows the voltage and current waveforms associated with the circuit of FIG. 13A.

FIG. 13B illustrates the waveforms in this embodiment of the invention. Initially, before the FETs 185 are turned on, the raw output voltage 188 seen at the rectifier input terminals will be sinusoidal. When the FETs are turned on, the source circuit is shorted and disconnected from the load. During this time, source energy is stored in the transformer leakage inductance. When the FETs are turned off, energy stored within the leakage inductance provides a voltage added to the source voltage thereby stepping up the voltage seen at the input to the rectifier bridge.

When the FETS are turned on, the voltage at the input to the rectifier bridge is near zero. When the FETs are turned off, the voltage will be stepped up to a voltage as defined by equation 2 and shown by 189 in FIG. 13B. Thus, the actual voltage seen at the input to the rectifier bridge will switch between ground and the step-up voltage 189.

The duty cycle of the FET transistors is not constant. During the time intervals 193 through 195 when the source circuit voltage is not large enough to charge the load and the output capacitance, the on time regulator increases the on-time duty cycle of the FETs to a maximum. During time periods 192 to 193 when less boost is needed, the duty cycle will be less than the maximum. For example, when the raw output voltage of the source is at a maximum, the on-time duty cycle of the FETs is at a minimum, providing a minimum boost.

FIG. 13B brings out three main benefits to the Boost Mode Regulation of isolation transformers. The first is associated with the improvement in power factors. The current waveform 198 shows that in comparison to the current waveform 137 in FIG. 10B, current is being drawn for a greater portion of the time during which the source is capable of delivering power. In fact, for the cases shown in FIGS. 10B and 13B, the power factor is improved by a factor of three.

The second benefit is also related to the improved power factor. Because of the increased power factor, the peak currents of the boost regulator design will be far less than those of the simple rectifier circuit of FIG. 10A. Consequently, the peak current rating and power dissipated within the isolation transformer, the rectifier components and the FETs are much lower.

The third benefit is associated with the output decoupling capacitor 186. Because the peak currents are lower, the size of the capacitor 186 can be reduced. The output voltage 199 with no output capacitor is very similar to the output voltage 200 when an output capacitor is present. The time interval 193 to 195 during which the output capacitor has to support the load is much shorter than the corresponding time interval in FIG. 10B. Therefore, the size of the output capacitor of a Boost Mode Regulator can be reduced not only because of the reduced peak current but also because of the reduced duration over which the current flows.

In the example shown, the boost regulator controls the on time duty cycle of the FETs in an effort to maintain a constant output voltage (by changing the duty cycle over the time of the sinusoidal source voltage variation as discussed earlier). In an alternate embodiment, if the duty cycle of the FET switches is maintained at a constant value for a substantial portion of the source cycle, the current would become more sinusoidal and the power factor of the circuit would be near unity. Thus, by merely changing the duty cycle of the FETs, the same circuit can be used for power factor correction.

Figure 14:
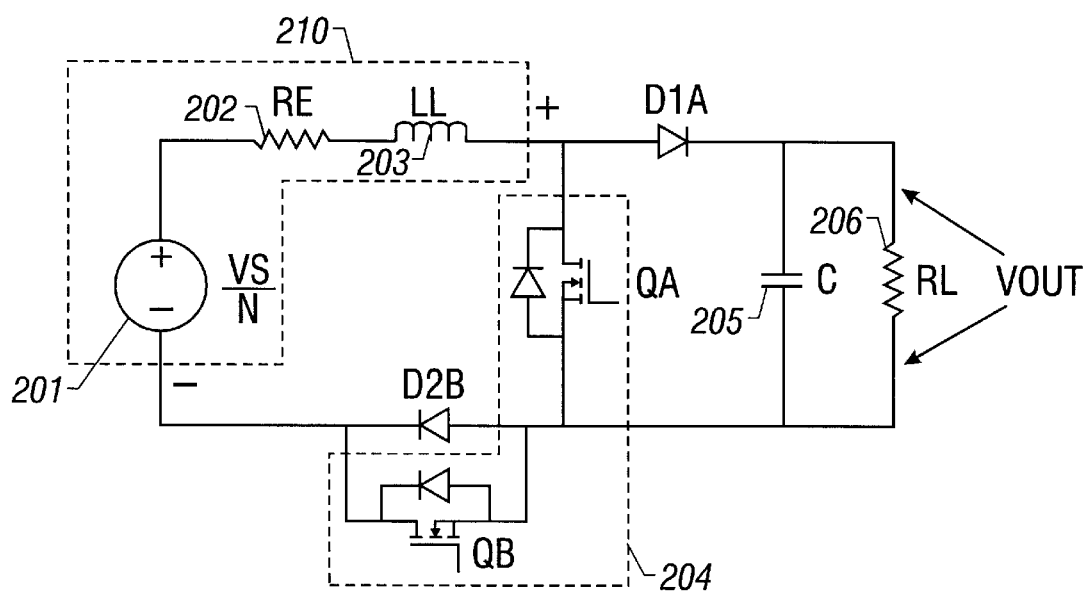
FIG. 14 shows an equivalent circuit of the embodiment of FIG. 13A when the source voltage is positive.

FIG. 14 is the equivalent circuit of the isolation transformer-BMR circuit at a time when the source voltage is positive. The source voltage 201, the series leakage inductance 203 and the equivalent series resistance 202 comprise the source circuit 210 When the FET switches 204 are off, current flows through rectifier bridge diode D1A and D2B to the decoupling capacitor 205 and the load and back through diode D2B. Those versed in the art would recognize the similarity of this circuit to that of FIG. 7. In fact, the circuit can be analyzed in the same way as was done above with reference to FIG. 7 above to give performance results comparable to those in Tables 1 and 2 above. Such a method of analysis would be known to those versed in the art and is not repeated here.

Figure 15A:
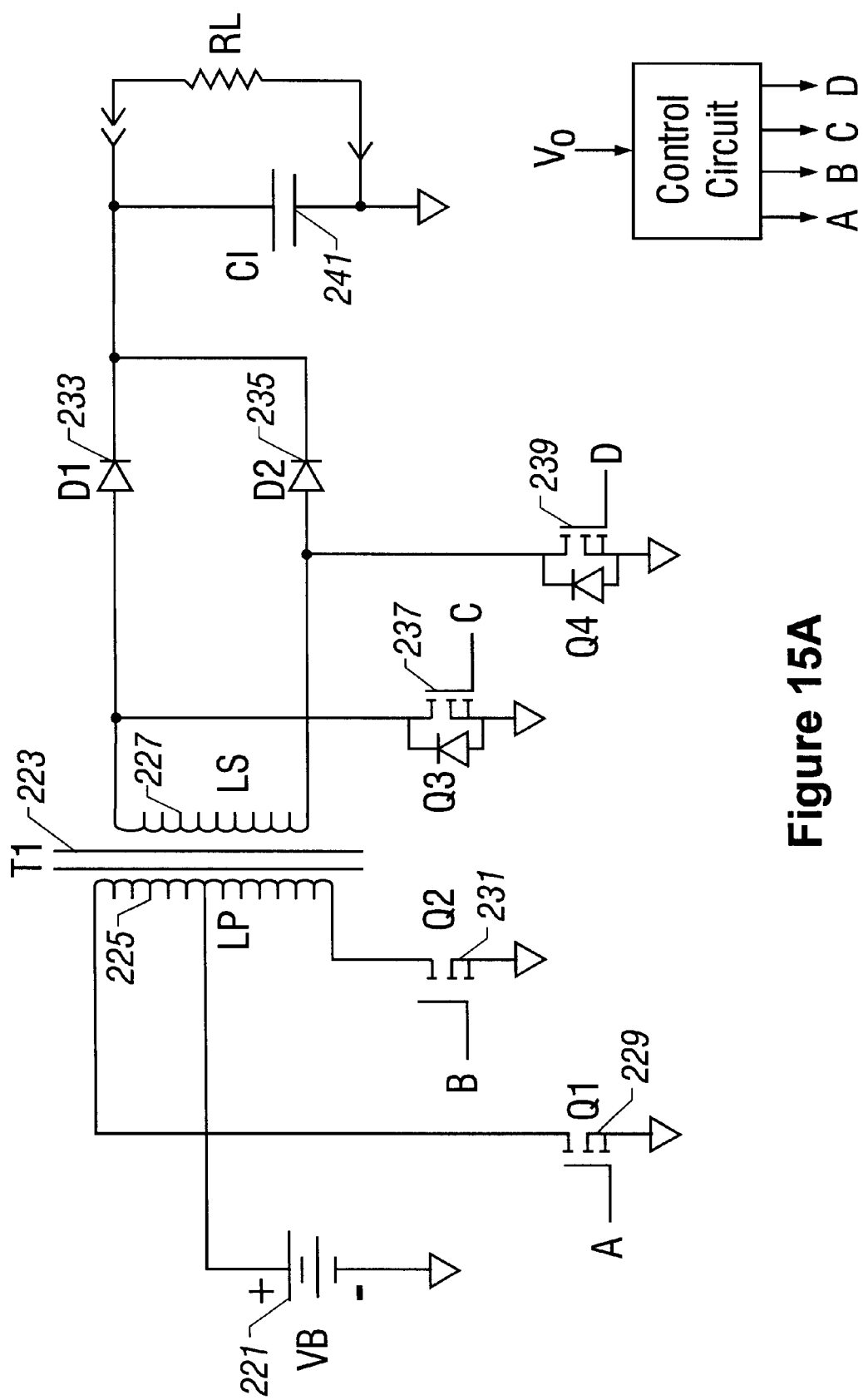
FIG. 15A shows a circuit arrangement for a device that provides regulated DC output from a DC source.

As noted above, another aspect of the invention is the use of Boost Mode techniques in DC-to-DC power conversion. FIG. 15A shows a circuit arrangement that provides for a regulated DC-to-DC conversion using Boost Mode techniques. An isolation transformer 223 is provided with a primary winding 225 and a secondary winding 227. The midpoint of the primary winding is connected to a DC source, denoted here by the battery 221. The ends of the primary winding 225 are connected to FETs 229 and 231. The FETs serve as choppers for chopping the input to the isolation transformer 225.

The secondary 227 of the isolation transformer is connected to the regulator circuit. The regulator comprises two rectifier diodes 233 and 235 with associated FETs 237 and 239. The output capacitance 241 and the load are connected to the output of the diodes.

Figure 15B:
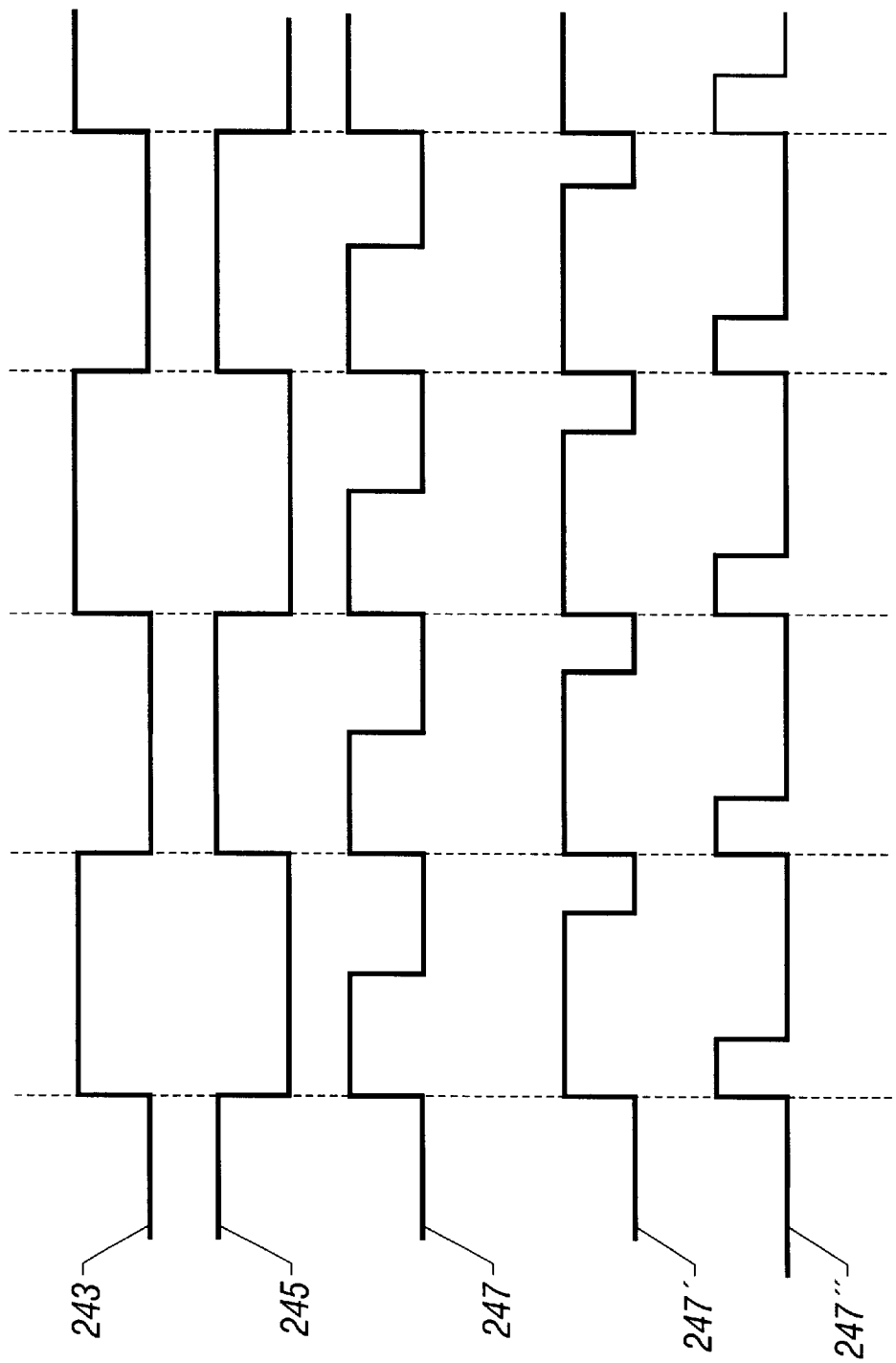
FIG. 15B shows the waveforms associated with the circuit of FIG. 15A.

As shown in FIG. 15B, 50% duty cycle waveforms 243 and 245 are applied to the FETs 229 and 231 respectively. Drive signals 243 and 245 are 180° out of phase and have the same frequency. A drive signal 247 is applied to the output FETs 237 and 239. Signal 247 has a fundamental frequency twice that of 243 and 245. The duty cycle of signal 247 defines the step up of the output stage in accordance with the Boost Mode Regulator theory discussed above. In the present instance, the duty cycle of 247 is 50%, giving a voltage boost of 2. For illustrative purposes, if the output FETs 229 and 231 are driven by signal 247' with a duty cycle of 75%, the step up is 4. Similarly, with drive signal 247" that has a duty cycle of 25%, the step up would be 1.33.

Those versed in the art would recognize that the overall boost in the voltage for a DC to DC power conversion would be the product of the boost of the output stage and the turns ratio of the transformer 223. The transformer turns ratio is selected such that the secondary voltage at the transformer output is less than the desired output voltage across the load $R_L$. A switchmode Pulse Width Modulation Controller (PWM), not shown, is used to control the duty cycle of the drive signal 247 so as to maintain a constant output voltage across the load.

Figure 16A:
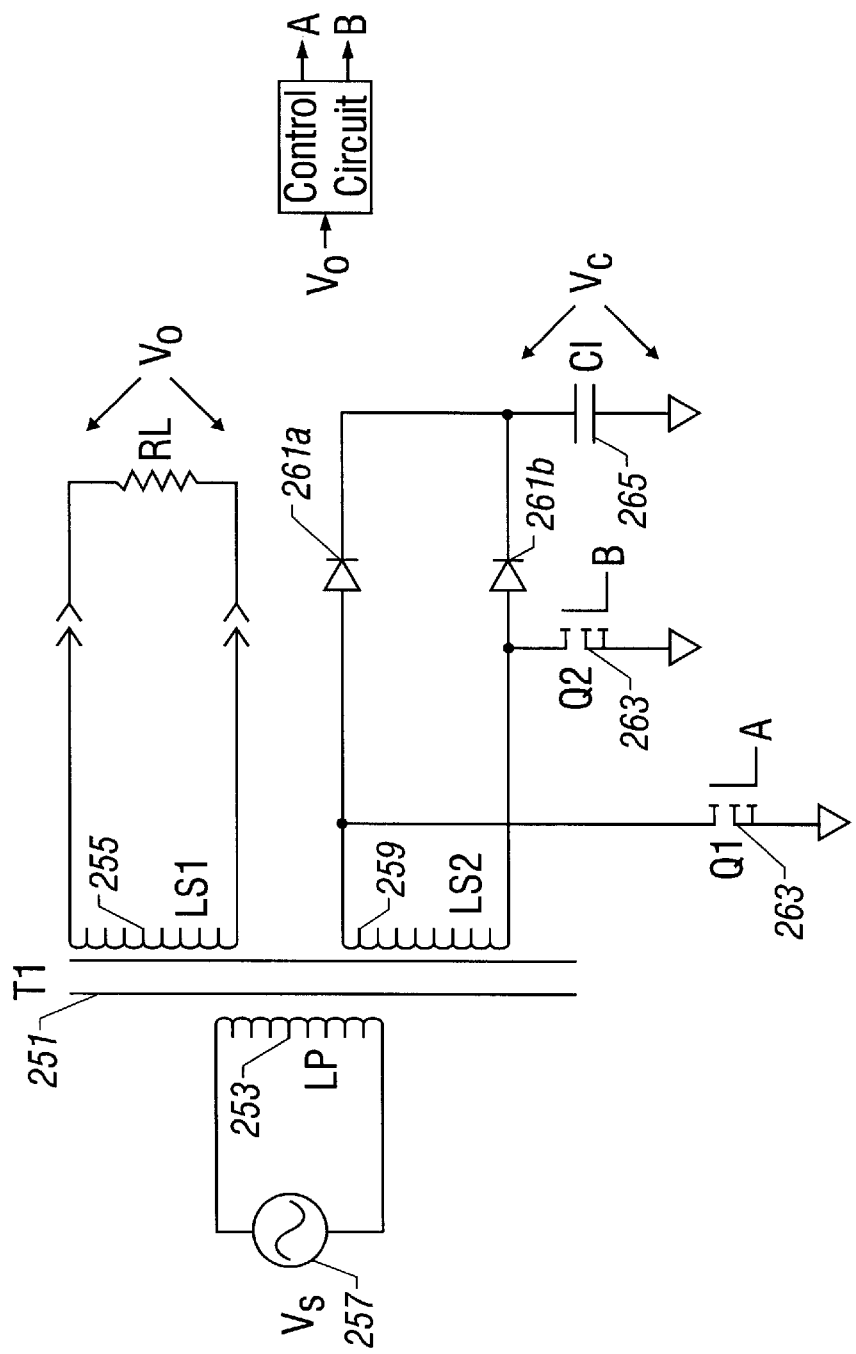
FIG. 16A shows a circuit arrangement for a device that provides regulated AC output from a regulated AC source.
Figure 16B:
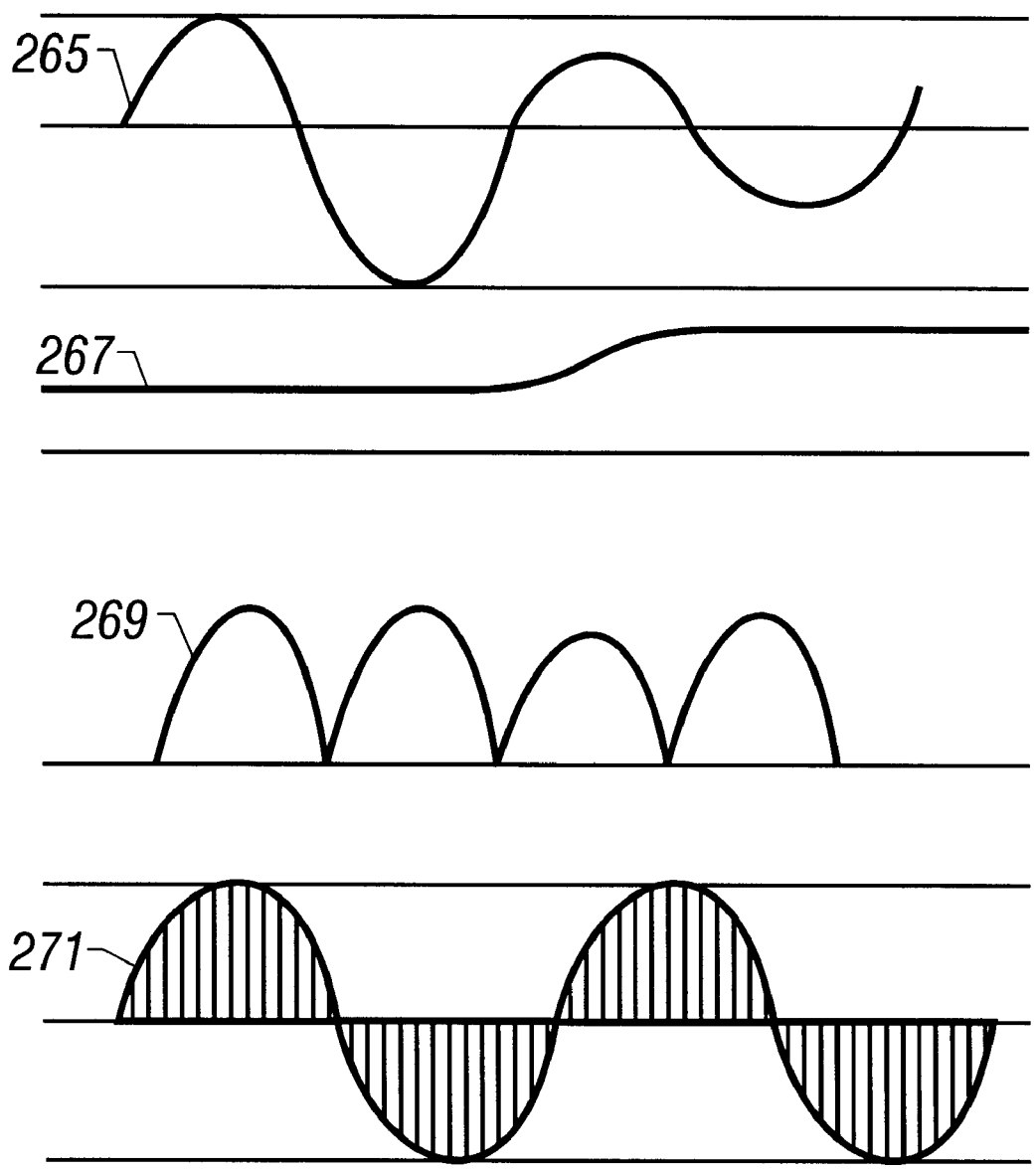
FIG. 16B shows the waveforms associated with the circuit of FIG. 16A.

Similar arrangements can be used for AC-to-AC power conversion. FIG. 16A illustrates an AC to AC Power Converter using Boost Mode Regulator techniques. An AC voltage source 257 is connected to the primary 253 of an isolation transformer 251. The transformer includes one secondary winding 255 (load secondary) coupled to the load and another secondary winding 259 (control secondary) coupled to the regulator circuit. The two secondaries 255 and 259 are wound closely together so as to maintain a high mutual inductance and low leakage inductance between the two secondaries 255 and 259. As with isolation transformers, the leakage inductance between the primary 253 and the secondaries 255 and 259 is relatively high and provides the necessary inductance for the Boost Mode Regulation.

As with the DC-to-DC converter discussed above in reference to FIG. 15A, the output FETs 263 are driven by identical drive signals (not shown). The frequency of the drive signals is much greater than the frequency of the AC signal being regulated. The duty cycle of the drive signals defines the step up of the output stage. This is schematically illustrated 265 by the decrease in the source voltage 257 over time. An output error amplifier (not shown) senses this decrease in the voltage and increases the duty cycle, denoted here by 267, of the control voltage of the drive signals. This duty cycle can be varied between 0% and 100%.

The regulator circuit includes two diodes 261a and 261b, a pair of FETs 263 for shorting the output of the regulator secondary 259, and a capacitor 265. The regulator circuit is designed to allow a high ripple voltage at the output of the capacitor 265. This high ripple voltage is reflected from the secondary control winding 259 to the secondary load winding 255 due to the mutual coupling therebetween and then across the load $R_L$. The output voltage at the load 271 is not a pure sinusoid; instead, it is a chopped (by the flyback effect) sinusoidal waveform with an envelope that is amplitude stabilized and power factor corrected. For connection to an inductive load, this output voltage can usually be used without modification but for a resistive load, it may be necessary to obtain a pure sinusoidal wave. Such a sinusoidal signal can be obtained by filtering the output.

As with embodiments of the invention discussed above, by comparing the output voltage phase and amplitude and adjusting the duty cycle of the FETs 263, the regulator can provide AC amplitude stabilization and Unity Power Factor correction. The control signal can for adjusting the duty cycle can also be obtained by using the voltage 265 across the output capacitance. The ability to control the power factor is extremely useful in industrial applications in which users are charged by utilities for low power factor. Conventional methods for power factor correction rely on special devices that are usually connected at the location where electrical power is supplied to an industrial user. With the present invention, it is possible to use the leakage inductance of isolation transformers and correct the power factor for individual sites within a plant. This is less expensive than having fixed power factor correction devices for an entire plant.

Figure 17:
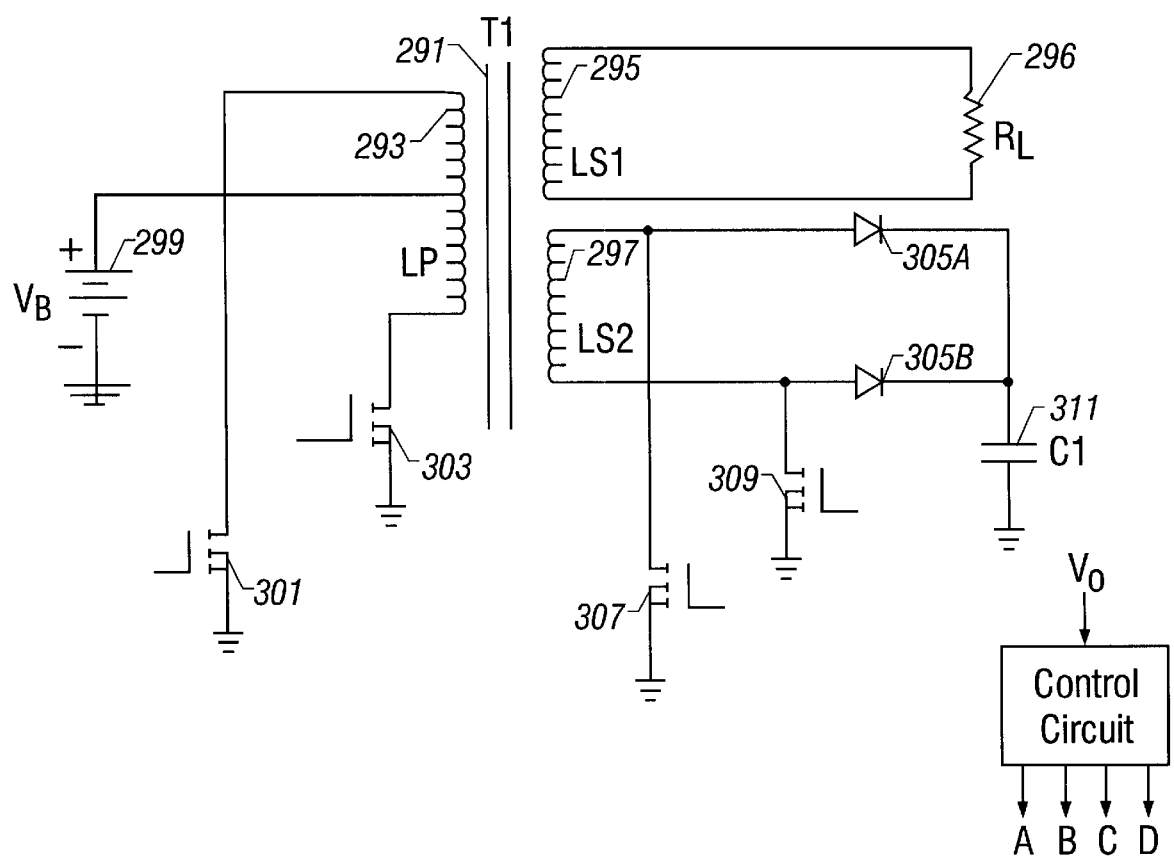
FIG. 17 shows a circuit arrangement for a device that provides regulated AC output from a DC source.

Yet another aspect of the invention is the provision of a stabilized AC power supply using a DC source. The circuit for performing this is shown in FIG. 17. It comprises an isolation transformer 291 with a primary winding 293 and two secondary windings 295. The primary winding is connected to a DC source 299 and is provided with two FET switches that function as choppers controlling the input to the primary 293 of the isolation transformer 291. The transformer has one secondary winding 295 (load secondary) coupled to the load and another secondary winding 297 (control secondary) coupled to the regulator circuit. The two secondary windings 295 and 297 of the isolation transformer are closely wound to have a high mutual coupling. As with isolation transformers, there is a relatively high leakage inductance between the primary 293 and the secondaries 295 and 297.

The secondary side performs in a substantially similar manner to that discussed above with reference to FIG. 16A wherein a high ripple voltage at the output of the capacitor 311 is reflected from the secondary control winding 297 to the secondary load winding 295 due to the mutual inductance therebetween and then across the load $R_L$. The output voltage at the load 296 is not a pure sinusoid; instead, it is a chopped (by the flyback effect) sinusoidal waveform with an envelope that is amplitude stabilized and power factor corrected. For connection to an inductive load, this output voltage can usually be used without modification but for a resistive load, it may be necessary to obtain a pure sinusoidal wave can be obtained by filtering the output. The voltage regulation is performed by adjusting the duty cycle of the FETs 307 and 309. The overall voltage boost is governed by the duty cycle of the FETs and by the ratio of the primary winding 293 to the secondary windings 295 and 297. The control signal for adjusting the duty cycle can be obtained by using the voltage 311 across the output capacitance.

The foregoing description has been limited to specific embodiments of this invention. It will be apparent, however, that variations and modifications may be made to the disclosed embodiments, with the attainment of some or all of the advantages of the invention. Those versed in the art would recognize that in circuits including superconducting elements, the resistivity term R in equation 1 becomes extremely small while the inductances in the circuit are still significant. As a result of this, the time constant τ becomes extremely large, as does the attainable output voltage from the boost mode circuit. Similarly, while the description has used FETs as the preferred device for performing the necessary shorting, other devices such as Silicon Controlled Rectifiers could also be used. Therefore, it is the object of the appended claims to cover all such variations and modifications as come within the true spirit and scope of the invention.

What is claimed is:

1. An apparatus for providing regulated d.c. voltage from a source of d.c. voltage, comprising:
   (a) a transformer having a primary winding and a secondary winding and a leakage inductance between the primary winding and secondary winding, the primary winding of the transformer coupled to the source of d.c. voltage;

(b) a chopper circuit coupled to the primary for chopping the voltage supplied to the primary winding;

(c) a rectifier circuit coupled to the secondary for converting the voltage from the transformer to a d.c. voltage;

(d) a power circuit having an on-time duty cycle associated therewith, said power circuit being operatively coupled to the rectifier circuit for selectively shorting the voltage from the transformer so as to store electrical energy within the leakage inductance of the transformer; and (e) a control circuit operatively coupled to the power circuit for regulating an on-time duty cycle of the power circuit to maintain a substantially constant d.c. voltage output from the power circuit.

2. The apparatus according to claim 1, wherein the rectifier circuit comprises a pair of diodes and the power circuit includes a pair field of FETs, each coupled to a diode, each such FET acting as a switch that turns on for a predetermined time period and turns off for a predetermined time period.

3. A method of obtaining a regulated d.c. voltage output from a source of d.c. voltage, comprising:

(a) coupling the source of d.c. voltage to the primary of a transformer, said transformer further having a secondary and a leakage inductance;

(b) coupling a chopper circuit to the source of d.c. voltage and the primary of the transformer;

(c) operating the chopper circuit to provide a chopped voltage to the primary of the transformer;

(d) rectifying the output from the secondary of the transformer to a d.c. voltage;

(e) selectively shorting the output from the secondary of the transformer for predetermined time periods so as to store electrical energy within the leakage inductance of the transformer, the predetermined time periods defining an on-time duty cycle; and (f) regulating the on-time duty cycle so as to obtain a regulated d.c. output.

4. The method of obtaining a regulated d.c. voltage output according to claim 3, wherein selectively shorting the output from the transformer is performed by a power circuit having a pair of FETs coupled to the output of the transformer, each such FET acting as a switch that turns on for a predetermined time period and turns off for a predetermined time period.

5. An apparatus for providing regulated a.c voltage at a load from a source of d.c. voltage, comprising:

(a) a transformer further comprising a primary winding, a load secondary winding coupled to the load, a control secondary winding, a mutual inductance providing magnetic coupling between the load secondary winding and the control secondary winding, and a leakage inductance between the primary winding and the control secondary winding, the primary winding of the transformer coupled to the source of d.c. voltage;

(b) a chopper circuit coupled to the primary for chopping the voltage supplied to the primary winding;

(c) a rectifier circuit coupled to the control secondary winding for converting the voltage therefrom to a d.c. voltage;

(d) a power circuit having an on-time duty cycle associated therewith, said power circuit being operatively coupled to the rectifier circuit for selectively shorting the voltage from the control secondary winding so as to store electrical energy within the leakage inductance of the transformer; and (e) a control circuit operatively coupled to the power circuit for regulating an on-time duty cycle of the power circuit to maintain a substantially constant a.c. voltage output from the power circuit.

6. A method of obtaining a regulated a.c. voltage output from a source of d.c. voltage, comprising:

(a) coupling the source of d.c. voltage to the primary of a transformer, said transformer further having a load secondary winding, a control secondary winding, a mutual inductance providing magnetic coupling between the load secondary winding and the control secondary winding, and a leakage inductance between the primary winding and the control secondary winding;

(b) coupling a chopper circuit to the source of d.c. voltage and the primary of the transformer;

(c) operating the chopper circuit to provide a chopped voltage to the primary of the transformer;

(d) rectifying the output from the control secondary of the transformer to a d.c. voltage;

(e) selectively shorting the output of the control secondary of the transformer for predetermined time periods so as to store electrical energy within the leakage inductance of the transformer, the predetermined time periods defining an on-time duty cycle; and (f) regulating the on-time duty cycle so as to obtain a regulated a.c. output.

7. The method of obtaining a regulated a.c. voltage output according to claim 6, wherein selectively shorting the output from the transformer is performed by a power circuit having a pair of FETs coupled to the output of the transformer, each such FET acting as a switch that turns on for a predetermined time period and turns off for a predetermined time period.

8. The method of obtaining a regulated a.c. voltage output according to claim 6 further comprising adjusting the on-time duty cycle within a predetermined range.

* * * * *